United States Patent [19]

Keene

[11] Patent Number: 5,553,220
[45] Date of Patent: Sep. 3, 1996

[54] MANAGING AUDIO DATA USING A GRAPHICS DISPLAY CONTROLLER

[75] Inventor: David Keene, San Mateo, Calif.

[73] Assignee: Cirrus Logic, Inc., Fremont, Calif.

[21] Appl. No.: 118,153

[22] Filed: Sep. 7, 1993

[51] Int. Cl.$^6$ .................................................. G06F 17/00
[52] U.S. Cl. .................... 395/154; 381/150; 379/88; 369/50; 345/203
[58] Field of Search .................... 395/154; 4/162; 381/150; 379/67–88; 369/50, 69; 345/203; 370/108, 119; 348/480–482, 232, 434, 462, 476–477, 479

[56] References Cited

U.S. PATENT DOCUMENTS

| | | | |
|---|---|---|---|
| 3,927,269 | 12/1975 | Yoshino et al. | 179/15 BS |
| 3,970,791 | 7/1976 | Johnson | 179/1.5 S |
| 4,253,119 | 2/1981 | Kergosien et al. | 358/145 |
| 4,295,155 | 10/1981 | Jarger et al. | 358/12 |
| 4,983,967 | 1/1991 | McKenzie | 341/110 |
| 5,072,297 | 12/1991 | Kanazawa et al. | 358/143 |
| 5,091,936 | 2/1992 | Katznelson et al. | 380/19 |
| 5,231,492 | 7/1993 | Dangi et al. | 358/143 |
| 5,355,450 | 10/1994 | Garmon et al. | 395/162 |
| 5,371,551 | 12/1994 | Logan et al. | 348/571 |

OTHER PUBLICATIONS

Preliminary Data Book For The CL–GD543X, "Alpine Family VGA GUI Accelerators", Nov. 1993.

Primary Examiner—Mark K. Zimmerman
Assistant Examiner—Joseph H. Feild
Attorney, Agent, or Firm—Steven Arthur Shaw; Lowe, Price, LeBlanc & Becker; Ian Cartier

[57] ABSTRACT

A graphics display controller is used to manage audio data within a computer-based multimedia system. A portion of the video display memory associated with the graphics display controller is allocated to one or more audio data buffers to hold digitized data for audio recording and/or playback. Preferably, the size and location of the audio buffer(s) relative to the video data is dynamically configureable within the memory. The timing of the audio data transfer into or out of the video display memory is preferably controlled by the video horizontal sync (HSYNC) signal, so that audio data transfers occur substantially during the pauses in video-memory access that correspond to the retrace time at the end of each video display line. A single, unified host CPU interface and related circuitry is preferably used for control or data-transfer functions related both to video graphics and to audio. For threshold-sensitive audio recording, a look-back buffer is preferably used to hold audio-data samples up to a fixed number of samples prior to the first sample that exceeds the current threshold value.

27 Claims, 10 Drawing Sheets

| | |
|---|---|
| GR 40 | WAVEPORT™ CONTROL 1 |
| GR 41 | WAVEPORT™ CONTROL 2 |
| GR 42 | INPUT AUDIO THRESHOLD DETECT LEVEL |
| GR 43 | AUDIO BUFFER MEMORY ADDRESS OFFSET |
| GR 44 | HOST READ, AUDIO BUFFER POINTER (LOW BYTE) |
| GR 45 | HOST READ, AUDIO BUFFER POINTER (HIGH BYTE) |
| GR 46 | CODEC INPUT, AUDIO BUFFER POINTER (LOW BYTE) |
| GR 47 | CODEC INPUT, AUDIO BUFFER POINTER (HIGH BYTE) |
| GR 48 | HOST WRITE, AUDIO BUFFER POINTER (LOW BYTE) |
| GR 49 | HOST WRITE, AUDIO BUFFER POINTER (HIGH BYTE) |
| GR 4A | CODEC OUTPUT, AUDIO BUFFER POINTER (LOW BYTE) |
| GR 4B | CODEC OUTPUT, AUDIO BUFFER POINTER (HIGH BYTE) |
| GR 4C | INTERRUPT CONTROL |
| GR 4D | INTERRUPT STATUS |
| GR 4E | RESERVED |
| GR 4F | RESERVED |
| | |
| GR 50 | CODEC CONTROL DWORD-BYTE D7:0 |
| GR 51 | CODEC CONTROL DWORD-BYTE D15:8 |
| GR 52 | CODEC CONTROL DWORD-BYTE D23:16 |
| GR 53 | CODEC CONTROL DWORD-BYTE D31:24 |
| GR 54 | CODEC STATUS DWORD-BYTE D7:0 |
| GR 55 | CODEC STATUS DWORD-BYTE D15:8 |
| GR 56 | CODEC STATUS DWORD-BYTE D23:16 |
| GR 57 | CODEC STATUS DWORD-BYTE D31:24 |
| GR 58 | AUX 1 BASE ADDRESS SELECT (LOW BYTE) |
| GR 59 | AUX 1 BASE ADDRESS SELECT (HIGH BYTE) |
| GR 5A | AUX 2 BASE ADDRESS SELECT (LOW BYTE) |
| GR 5B | AUX 2 BASE ADDRESS SELECT (HIGH BYTE) |

FIG 11

MANAGING AUDIO DATA USING A GRAPHICS DISPLAY CONTROLLER

FIELD OF THE INVENTION

This invention relates generally to digital computer systems, and particularly to the architecture of computer-based multimedia systems. More particularly, it relates to techniques of allocating and managing system resources within such systems to allow codec-based audio controller subsystems to utilize memory, bus interfaces and other resources normally reserved for and used by a video graphics controller.

BACKGROUND OF THE INVENTION

Computer-based multimedia systems bring together a number of hardware and software tools with a common goal; creating a cohesive interactive environment that involves the human senses, especially sight and sound. Multimedia simply means using several communications sources simultaneously. Computer-based multimedia systems require the integration of a number of sophisticated functions or capabilities that can provide both sound and animation. The level of this functionality requires, in most cases, substantial or dedicated use of key system resources, such as memory and direct memory access circuitry. The management, allocation, and use of these key system facilities significantly affect the performance and cost of the systems required to support such an application.

Applications involving computer-based sound reproduction are some of the more demanding functions of a multimedia system. A typical way to meet these demands is shown in FIG. 1. A computer system with a Graphics Display (100), a Video Display Memory (101), and a Video Graphics Adapter (102) is supplemented with an Audio Subsystem, which includes a dedicated add-in adapter card that contains Multimedia Audio Controller (103), a Speaker or Headphones (104) and a Microphone (105). The Video Graphics Adapter (102) and Multimedia Audio Controller (103) each include Host Bus Interfaces, (106) and (107) respectively, that connect to the Host CPU Bus (109). Additionally, Multimedia Audio Controller (103) typically includes a DMA interface (108), for direct memory access to Memory (110) via Host CPU (111).

An audio codec such as shown in FIG. 1 contains both digital-to-analog and analog-to-digital converters, which provides the ability to transform audio from an input transducer like a Microphone (105) into its digital form for storage in a disk file and then transform it back to its analog form to an output transducer, for example, Speaker or Headphones (104). However, as higher levels of IC integration are achieved, it becomes desirable to combine functions. Thus, there is a need to have a combined and simplified system architecture that supports both audio and video graphics.

The first level of audio subsystem performance has sample rates ranging from 11 KHz to 22 KHz, with each sample having eight bits of resolution. This is sufficient for speech and some forms of music. The next level of audio-subsystem performance supports CD-quality sound, with sample rates of 44.1 KHz and sixteen-bit-per-sample resolution. CD-quality audio subsystem performance requires a more specialized and sophisticated digital audio subsystem.

At the center of many audio subsystems is a single chip containing both analog-to-digital and digital-to-analog converters such as an Audio Codec (112). Today's Audio Codecs are designed with either serial or eight-bit parallel interfaces. Depending on which type, these controllers require varying degrees of additional support components and host system resources. Specifically, in ISA-based systems like the IBM PC/AT, the codec-audio controller must have 1) the use of a DMA channel that is programmed to transfer data between the controller and memory, 2) bus control and address decode logic, and 3) a portion of system memory reserved for use as audio data buffers. Thus, these audio subsystems are totally dependent on the availability of memory and DMA system facilities, which in turn, govern the performance and throughput of computer-based sound for multimedia application.

One problem of computer-based audio is to service data transfer requests between Multimedia Audio Controller (103) and Memory (110), or between different areas of Memory (110) on a timely basis. This problem is particularly challenging given the frequency and the manner in which these transfers occur. Typically, a PC-based or equivalent system has a set of programmable DMA channels, each with either a eight- or sixteen-bit data path—but these are, in general, considered rather slow to respond to a new data transfer request. Each time a DMA data transfer occurs, the host CPU is put into a hold state. Once the transfer has been completed the CPU is then released. In order to service an audio subsystem effectively, Multimedia Audio Controller (103) must include a DMA interface (108) and a DMA channel in host CPU (111) that is set up to service data transfers at speeds equivalent to the audio sampling rate. For example, at a sample rate of 44.1 Khz, the DMA channel must service these requests every 22 usec. If another system request or operation takes longer than 22 usec to execute before it can be stopped by a pending DMA request, the audio controller will miss the transfer and either recording errors or playback noise pops will occur. Thus, there is a need for an approach to service audio data transfer requests in a computer system in a timely fashion.

A related problem is that while a typical tape recorder can only either play or record at any one time, many multimedia applications require more involvement and interaction. Even an ordinary phone call, for example, is a full-duplex process in that both recording or speaking, and playback or listening occur simultaneously. DMA channels in a typical computer system are uni-directional. Thus, full-duplex record and playback requires using two sequential DMA transfer requests over a single DMA channel, unless one DMA channel is dedicated to audio recording and a second DMA channel is dedicated to audio playback. If two DMA channels are dedicated to sound reproduction, then the available DMA resources (which is only a few channels in a typical PC-like system) are substantially occupied by sound reproduction, thus drastically reducing the overall throughput and performance of the system on other tasks. Therefore, there is a need to support full duplex sound reproduction without excessively consuming the resources of the host computer system.

Another problem of computer-based audio is to efficiently allocate and use memory for codec-based audio applications. The prior-art solution to this problem is to take the buffer space required to properly support the application from available portions of Memory (110). In this case, the operating system, by means of its memory manager, is responsible for managing and allocating these dedicated buffers. When an application begins execution, the operating system looks at the memory map to determine where to place that application. It then finds and allocates the appropriate amount of memory to run that application. When buffer space is requested, the operating system, once again, is responsible to make it available from what memory space remains. The time it takes the operating system to service such requests coupled with the latency, caused by system bus to service data transfers, can be excessive. Once again, this has a similar result, specifically, poor audio record or playback performance.

A second prior-art solution to the memory-allocation problem incorporates adequate memory buffers into Multimedia Audio Controller (103) that are specifically dedicated to audio reproduction. Even though this solution alleviates the problem, it adds significant costs and complexity to manufacture and test such a computer-based audio system. Thus, there is a need for an approach that efficiently allocates and uses memory within a computer system for audio data.

Another problem of computer-based audio recording is to efficiently allocate and use memory and Host CPU time for audio applications, such as voice response, where it is desired to take some action, or to activate sound recording, only when the level of sound being observed by microphone (105) exceeds a particular threshold. One prior-art solution to this problem is for Multimedia Audio Controller (103) to simply discard all audio samples prior to the first sample that exceeds this threshold. An advantage of this approach is that Memory (110) is not used to store any apparently irrelevant audio samples, but system bandwidth is still used to check the data. For applications such as speech recognition, however, if the threshold is set high enough that all background noise softer than a word is discarded, then the samples that immediately proceed the first over-threshold sample may in fact contain information that would aid the recognition of that word. In such cases, speech recognition software executing on Host CPU (111) must lower the threshold that it sets for Multimedia Audio Controller (103). But this, in turn, means that Multimedia Audio Controller (103) sometimes starts the recording process due to background noise, which it passes on to Memory (110), and which subsequently the speech recognition software analyzes as a possible word. This needlessly consumes buffer space for audio samples within Memory (110), as well as bandwidth on Host CPU bus (109). Thus, there is a need for an approach that allows the start-recording threshold to be set high enough to filter noise without losing useful samples.

SUMMARY OF INVENTION

A graphics display controller is used to manage audio data within a computer-based multimedia system. A portion of the video display memory associated with the graphics display controller is allocated to one or more audio data buffers to hold digitized data for audio recording and/or playback. Preferably, the size and location of the audio buffer(s) relative to the video data is dynamically configureable within the memory. The timing of the audio data transfer into or out of the video display memory is preferably controlled by the video horizontal sync (HSYNC) signal, so that audio data transfers occur substantially during the pauses in video-memory access that correspond to the retrace time at the end of each video display line. A single, unified host CPU interface and related circuitry is preferably used for control or data-transfer functions related both to video graphics and to audio. For threshold-sensitive audio recording, a look-back buffer is preferably used to hold audio-data samples up to a fixed number of samples prior to the first sample that exceeds the current threshold value.

An object of the present invention is to reduce both the cost and complexity of computer-based multimedia systems by providing a combined and simplified computer-system architecture for audio and video graphics that allows codec-based audio controller subsystems to utilize memory and other resources that are typically reserved for a video graphics controller.

Another object is to coordinate the timing of video memory access the video memory for audio data with the timing of the video-memory access for video data, such that audio data and video data can share the memory bandwidth with minimal conflict.

Another object is to avoid glitches in the audio signal, i.e. to service audio-data transfer requests on a timely basis.

Another object is to reduce the impact on computer-system performance of supporting full-duplex sound reproduction.

A further object is to increase the efficiency of computer-based multimedia systems by performing audio-data transfer and audio-subsystem control using memory, host CPU bus interfaces or other system resources that are typically already present for video graphics within a typical computer system, but are often less than fully utilized.

A still further object is to support a threshold at which recording is to be started that can be set high enough to filter noise without loosing useful audio samples just prior to the over-threshold sample.

Another object is to an effectively manage both audio and video I/O within the address-space allocations that are standard for IBM PC-compatible systems.

BRIEF DESCRIPTIONS OF THE DRAWINGS

FIG. 11 summarizes WavePort™ registers.

DETAILED DESCRIPTION OF THE PREFERRED EMBODIMENT

Figure 1:
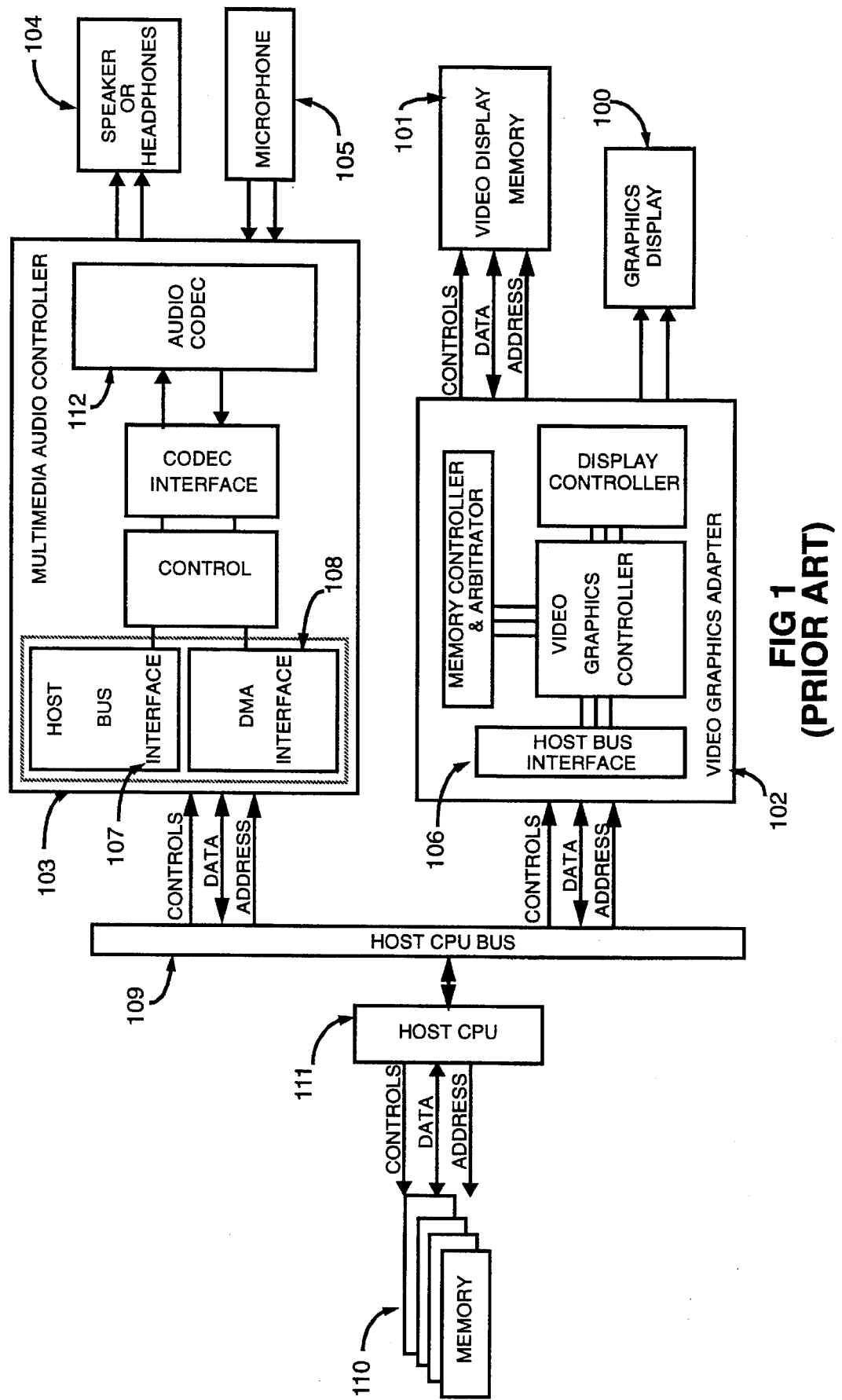
FIG. 1 is a block diagram of the audio and video graphics subsystems of a typical computer-based multimedia system.
Figure 2:
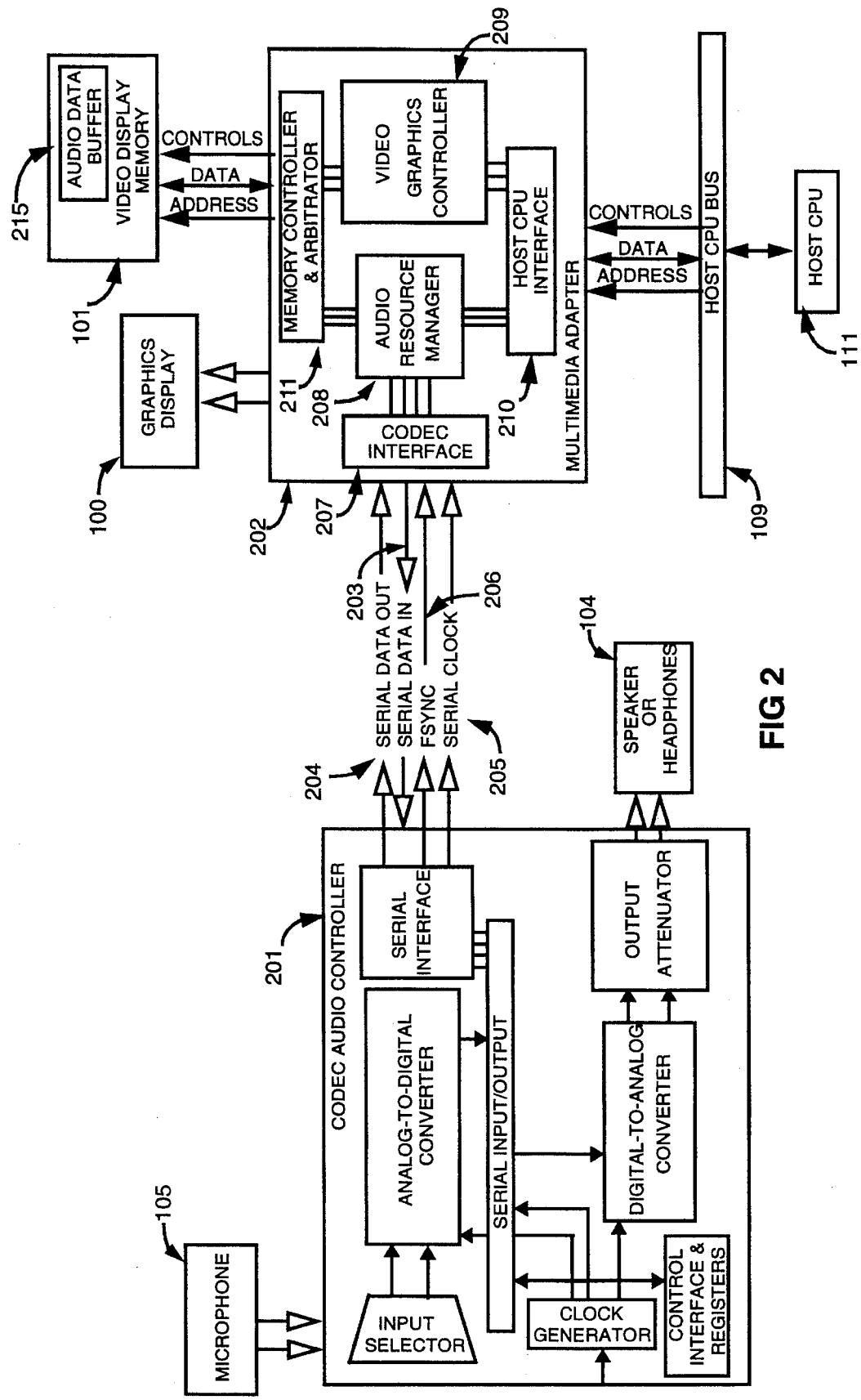
FIG. 2 is the overall architecture of the present invention, particularly the connectivity used to integrate Audio Codec (201) with Video Graphics Controller (209).

FIG. 2 shows the architecture and connectivity used to integrate an Audio Codec (201) with a Multimedia Adapter (202) using a four-line serial bus. The interface is comprised of two data lines, i.e. Serial Data in (203) and Serial Data out (204); a line for the Serial Clock (205); and a line for Frame Sync (206). Serial Data In (203) and Serial Data Out (204) are used to transfer digital audio data into and out of Audio Codec (201). Serial Clock (205) controls when data is transmitted and received by the Audio Codec (201). Data is transmitted on the rising edge and is received on the falling edge of this signal. Its frequency is equal to the data rate. Frame Sync (206), sampled by the serial clock, indicates when a new data frame is about to start. The frame Sync (206) and Serial Clock (205) are generated within the Audio Codec (201) for the purpose of controlling the timing of the data sent between the Audio Codec (201) and the Multimedia Adaptor (202). This 4-line bus is connected to the Codec Interface (207) of Multimedia Adaptor (202). The 4-line bus and Codec Interface (207) are used to functionally integrate Audio Codec (201) with the Audio Resource Manager (208) of Multimedia Adaptor (202).

In the embodiment preferred by the inventors, an integrated circuit (IC) manufactured by Crystal Semiconductor of Austin, Tex. known as the CS4215 is used for Audio Codec (201). This IC provides both the digital-to-analog and analog-to-digital conversions that are needed for full-duplex audio. Nevertheless, it is clear that if only audio playback or only audio recording is required in a particular embodiment of the invention then Audio Codec (201) could be appropriately simplified without departing from the spirit or scope of the present invention. Also, the preferred embodiment can be viewed as adding Audio Resource Manager (208) and Codec Interface (207) to the Video Graphics Controller (209), the Host CPU Interface (106) and the Memory Controller and Arbitrator (211) that are already present in an IC manufactured by Cirrus Logic of Fremont, Calif. known as the CL-GD5434.

Figure 3:
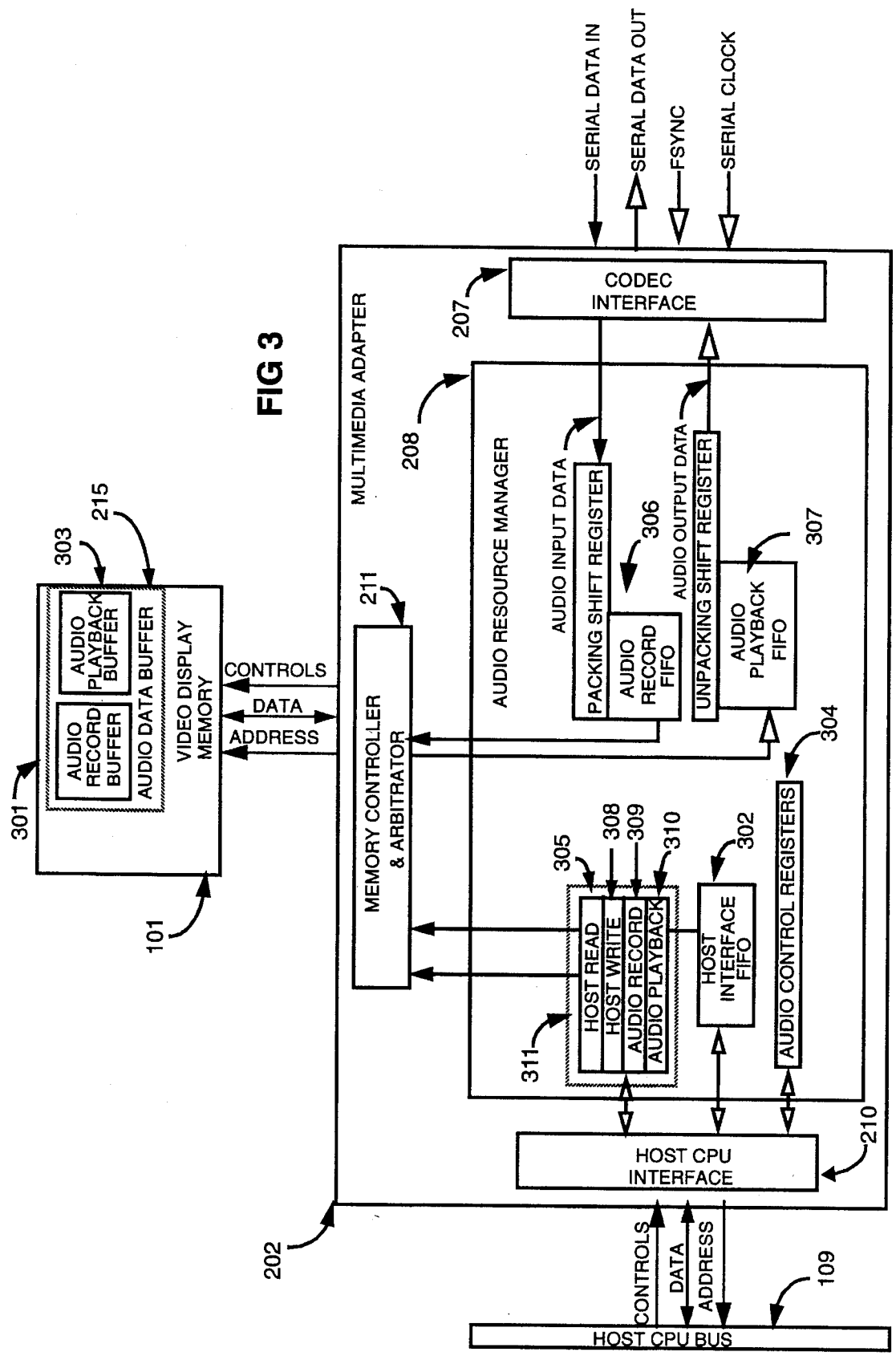
FIG. 3 is a block diagram of the organization and the logic elements that comprise Audio Resource Manager (208).

FIG. 3 shows a block diagram of the organization and the logic elements of the Audio Resource Manager (208). Working in concert with the Audio Codec (201), the Audio Resource Manager (208) provides two functions. The first function is as a communications manager. In conjunction with Host CPU Interface logic (210) and Host CPU Bus (109), it provides a functional path between Audio Codec (201) and Host CPU Bus (109). The second function is as a buffer or memory manager. Via Memory Controller and Arbitrator (211), a portion of Video Display Memory (101) that is unused for graphic data is used as a dynamically configureable data buffer for audio data going into or out of Audio Codec (201).

Today, video graphic adapters are configured with as much as one or two megabytes of display memory. Typically, the display memory is capable of storing more data than can be displayed at any one time. For example, an application requiring 1024×768 graphics and 256 colors uses approximately 700 Kbytes of memory, which leaves as much as 256 Kbytes of the 1 megabyte of memory available. While some of this is used for hardware cursor and graphics data caching functions, 64 K bytes can be reserved as buffer space for audio data. For support of full-duplex audio, Audio Data Buffer (215) is configured with two large buffer segments, one for input or recording and a second for output or playback. Audio Data Buffer (215) is used to service the Audio Codec (201) in a timely manner by compensating for the differences in transfer rate and latency between the steady, but relatively slow, rate at which Audio Codec (201) produces or consumes audio data and the burst-like, but relatively fast rate, that audio data is put into or taken out of Host CPU (111).

Also shown in FIG. 3 are the elements required to effectively interface to Host CPU (111). The Host Interface FIFO (302) is preferably a single four-level 32-bit wide interface facility that provides Host CPU (111) with both read and write access to the Audio Data Buffer (215) via Memory Controller and Arbitrator (309). Under control of a program executed on Host CPU (111), the Audio Control Registers (304) control configuration and access management of Audio Data Buffer (215). The role of the Audio Control Registers (304) are to control specific functions relating to the size of the audio buffer, the audio data format and access to the Audio Data Buffer (215) as well as to control the operation of Audio Codec (201). The Host Read/Write Pointers (305) maintain and control the address order of the audio data in memory as read into or a written from Host CPU (111). The detailed design of the interface between Host CPU (111) and Audio Resource Manager (208) is described in Appendix I to this specification, entitled "Audio Port for Alpine/CL-GD5434", which is incorporated herein by reference.

Also shown in FIG. 3 are Audio Record FIFO and register set (306) and Audio Playback FIFO and register set (307). Each of these FIFOs are configured with a 64-bit shift and packing/unpacking register and a three-level, 32-bit-wide FIFO. The Audio Record FIFO and register set transfers digitized audio data into the Audio Data Buffer (215) from the Audio Codec (201). The Audio Playback FIFO and register set transfers digitized audio data from the Audio Data Buffer (215) to the Audio Codec (201).

Figure 4:
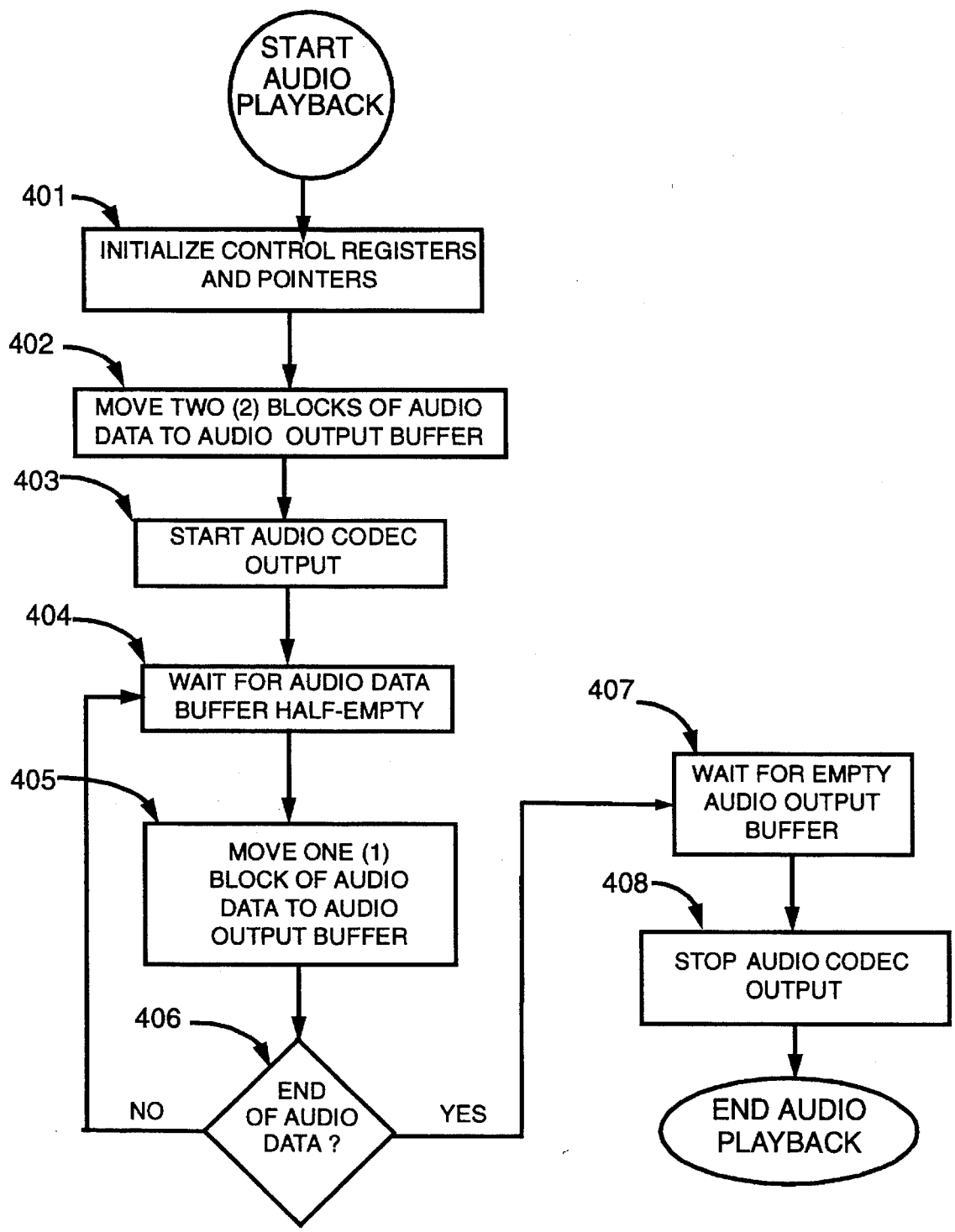
FIG. 4 is a flow chart of the software process used to move digitized audio data into the Audio Data Buffer (215) and to start and stop the playback function of Audio Codec (201).

FIG. 4 is a flow chart of the software process that executes on Host CPU (111) that moves digitized audio data into Audio Data Buffer (303) and to control the playback function of Codec Audio Controller (201). FIG. 4 assumes that the audio data to be played back or output is available from Host CPU (111) organized into blocks, where each block is half the size of Audio Data Buffer (303). Often the audio data blocks are read from a disk file. However, the audio data to be played back can be from any source and can be organized in any block size.

When it is desired to start audio playback, control passes to Step (401), which initializes Audio Control Registers (304) and the pointers within Audio Resource Manager (208). In particular, Host Write Pointer (308) and Audio Playback Pointer (308) are initialized to point to the same location within Audio Playback Buffer (301), which will become the location of the first word to be output or played back.

Next in Step (402), the first two blocks of this audio data is transferred from Host CPU (111) to the Host Interface FIFO (302), preferably via a block move instruction. Subsequently, this audio data is transferred from Host Interface FIFO (302) to Audio Playback Buffer (301) without any further software involvement. Note that the software does not keep track of the exact location within Audio Playback Buffer (301) of each sample of the audio data as it is transferred. Rather it simply writes to Host Interface FIFO (302) at a fixed location and Host Write Pointer (308) keeps track of the exact location at which to store each word of audio data within Audio Buffer (303). Host Write Pointer (308) advances as each word is written. Note that to "advance" to the next memory location, Host Write Pointer (308) is typically simply incremented. However, if the next memory location is the end of Audio Playback Buffer (301), then the value of Host Write Pointer (308) is reset to the start of the buffer. Further, if incrementing the value of Host Write Pointer (308) makes it equal to the value of Audio Playback Pointer (308), then Audio Playback Buffer (301) is full and storing any more data would result in erroneous playback. Thus, Audio Playback Pointer (308) is the consumer or output pointer and Host Write Pointer (308) is the producer or input pointer for a circular addressing scheme within the memory space allocated to Audio Playback Buffer (301). Similarly, Audio Record Pointer (308) is the producer or input pointer and Host Read Pointer (305) is the consumer or output pointer for a circular buffer within Audio Playback Buffer (303). The concept of a circular buffer is well known in the prior art.

Next in Step (403), the software initiates audio output from Codec Audio Controller (201) via Audio Control Registers (304). Next in Step (404), the software waits for Audio Playback Buffer (301) to become half empty. Preferably, this is done by suspending this software process and allowing Host CPU (111) to perform other tasks until it receives an interrupt from Audio Resource Manager (208) indicating that the buffer is half empty. At that time, control passes to Step (405), in which the next block of audio data is transferred from Host CPU (111) to the Host Interface FIFO (302). Again, this is preferably done via a block move instruction, and again this audio data is subsequently transferred from Host Interface FIFO (302) to Audio Playback Buffer (301) without software involvement.

Step (406) decides whether or not there is another block of audio data to be played back. If so, then control transfers to Step (404), where the software waits for the puffer to become half empty. If not, then control transfers to Step (407), where the software waits for the buffer to become entirely empty. Again, if it is desired to allow Host CPU (111) to perform other tasks concurrently, then Step (407) could be implemented via an interrupt mechanism. When Audio Playback Buffer (303) is completely empty, control passes to Step (407), in which the playback or output function of Codec Audio Controller (201) is halted.

The audio record or input function is not described in detail herein, but it is essentially the above-described audio play back function with the direction of data flow reversed.

Figure 5:
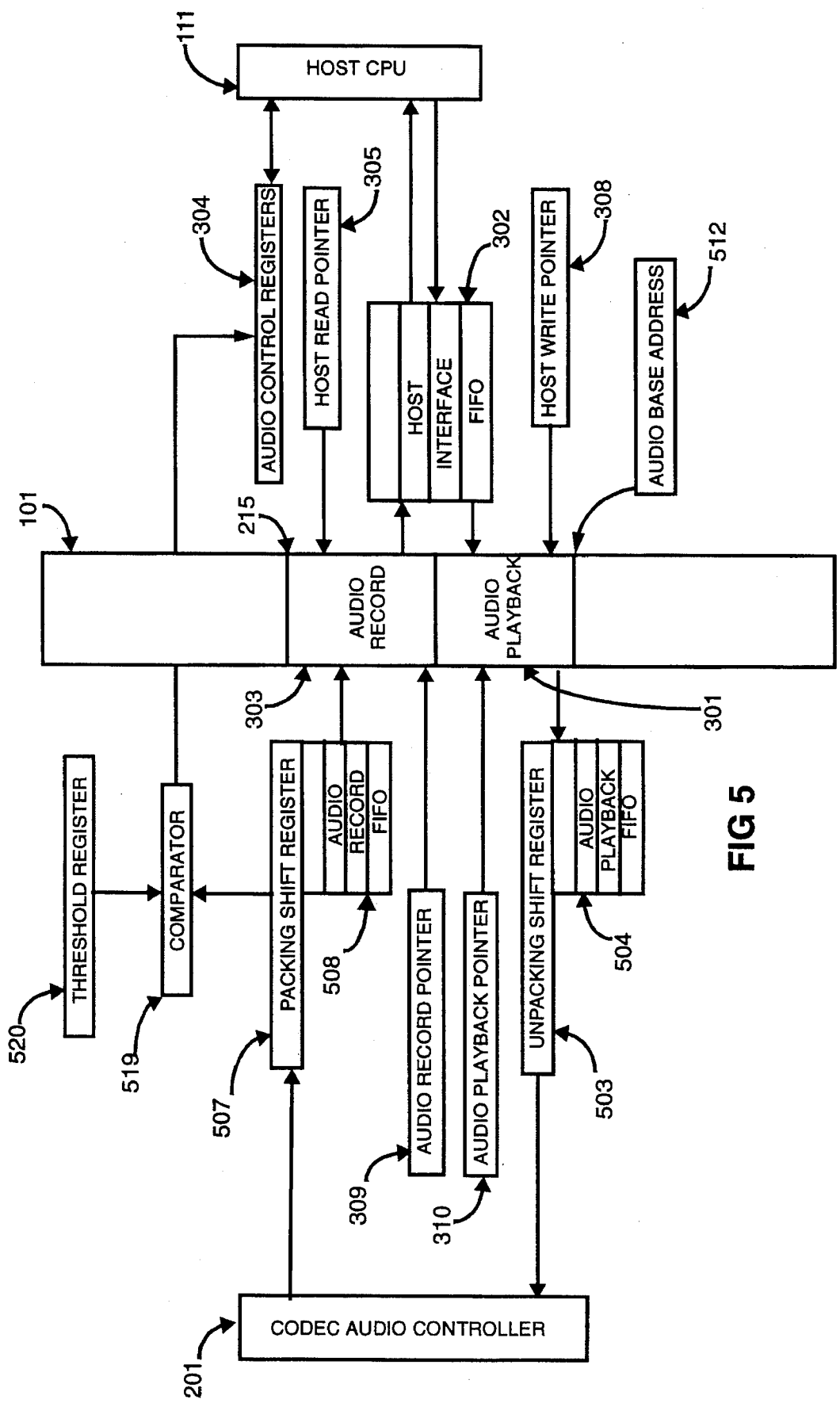
FIG. 5 is an architectural and data flow representation of Audio Resource Manager (211).

FIG. 5 depicts the data flow employed to allocate and use the under utilized segment of Video Display Memory (101) as a configureable data buffer and other system resources to support codec-based full duplex sound application.

Unlike the other approaches described earlier, the present invention provides a serial interface structure that permits the Audio Codec (201) to access resources of the Video Graphic Controller (209). It comprises of two very similarly configured FIFOs. The first of these is the Audio Record FIFO (508). The 64-bit shift register (507) is serially loaded with two sixteen-bit audio samples under the control of the serial interface clock. It converts these samples into a 32-bit data word. That data word is then transferred in a parallel fashion into the FIFO stack. If the audio sample is less than sixteen-bits, four- or eight-bits for example, then the shift register packs or combines those samples from multiple data frames into a complete 32-bit data word before it is transferred to the FIFO. Words are pushed down a level in the FIFO stack each time a data word is generated by the shift register. Whoa at least two data words are stored in the FIFO stack, the contents are transferred to the Audio Data Buffer (215) at the next available horizontal sync pulse.

The Audio Playback FIFO (504) retrieves or receives data from the Audio Data Buffer (518). The Audio Playback FIFO (504) receives audio data only when two levels in the FIFO stack are empty. When a 32-bit data word is written into the FIFO (504) and then is pushed up the 64-bit shift register (503), the shift register serializes the parallel data words and converts them into a serial data stream. If the audio format is either four-bit or eight-bit, the shift register sequentially unpacks the data word into multiple audio data frames. After the data is in serial form, it is transmitted to the Audio Codec (201) for playback.

Video Graphics Controller (209) typically controls the manner in which video data is displayed via a horizontal sync (Hsync) pulse (601), a vertical sync (Vsync) pulse and a video display signal. The Hsync and Vsync timing pulses vary depending on the type of monitor and the display mode used. The video display signal vary depending on the image to be displayed. The horizontal and vertical syncs dictate the scan rate of the display and synchronize the display device with the video graphics controller. In a raster-type CRT display, the vertical sync timing pulse is used to return the electronic beam to the top of the display device prior to the next frame. The horizontal sync pulse (601) is used to return the electron beam to the left edge of the display device prior to the next scan line.

Figure 6:
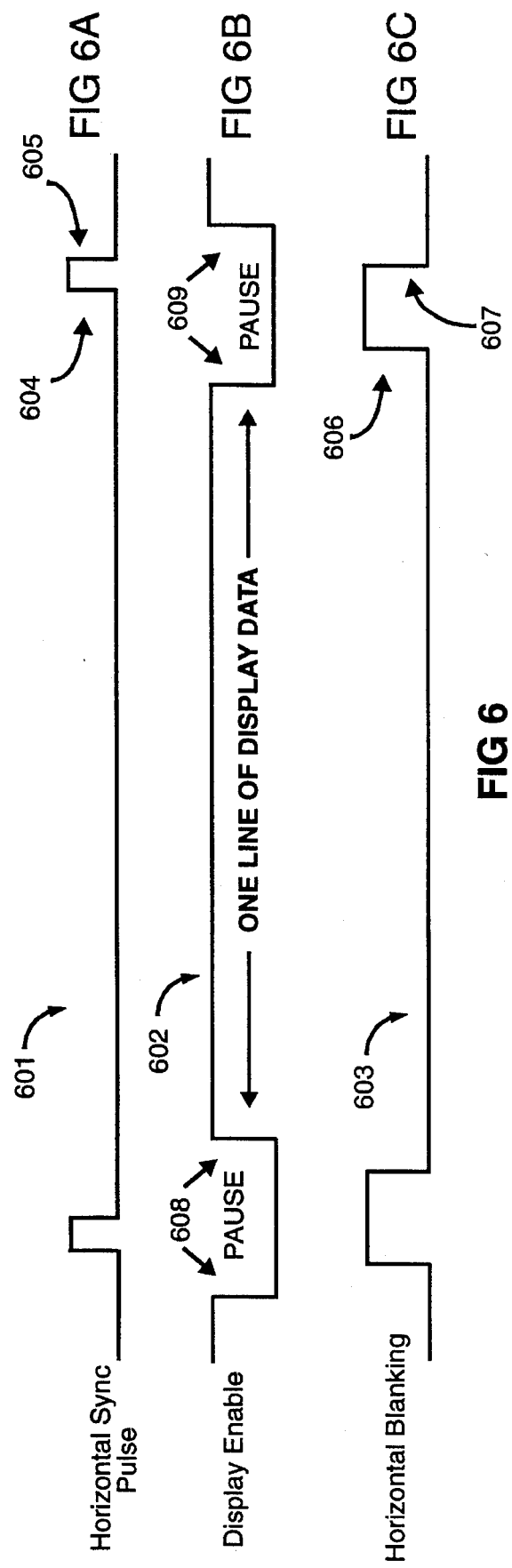
FIG. 6 is an event and timing diagram of the Horizontal Synch Pulse.

As shown in FIG 6, the video data is displayed as a sequence of frames, where each frame is a top-to-bottom sequence of scan lines, and each scan line is a left-to-right sequence of pixels. A pixel, or picture element, is a region of the display device that has a uniform color and intensity, that is determined by the video display signal. At the end of each scan line, the Horizontal sync (Hsync) pulse (601) indicates that the scan line is finished. Upon receipt of this pulse, the display device preferably shuts off the electron beam and sends it back to the left side of the display prior to scanning or displaying the next line. Similarly at the end of each frame, the Vertical sync (Vsync) pulse indicates that the frame is finished. Upon receipt of this pulse, the display device preferably shuts off the electron beam and sends it back to the top of the display prior to scanning the first line of the next frame. For example, several commonly used display modes applicable to computer-based multimedia systems use 480 scan lines per frame and 640 pixels per scan line and 8 to 24 bits to control each pixel's color and intensity.

Video Graphics Controller (209) preferably contains an internal counter, which increments per pixel, or per text character (which preferably is eight to nine pixels in width). Horizontal display timing events are driven when the internal counter equals the value set in one of the relevant horizontal registers. These registers are among those known in the prior art as CRT Control (CRTC) registers. The basic horizontal display timing events are horizontal sync pulse(601), Display Enable (602), and Horizontal Blanking (603). The horizontal sync pulse (601) can be thought of as the master display timing pulse. Its active pulse starts when the internal counter equals the value in the Start Hsync Retrace register, and ends when its low-order five bits equal the value in the End Hsync Retrace register.

Display Enable (602) indicates when the video data is transferred from the Video Display Memory (101) to the display device. As long as Display Enable(602) is activated, video data is transferred to the display device. The Horizontal Total Register dictates the number of pixels or characters transferred in each scan line. When the value of the internal counter reaches the value of the Horizontal Total Register, the display output is blanked and the electron beam is shut off. There is a pause (608) while the electron beam is being repositioned (i.e no video data transmitted from the Video Display Memory (101) to the display device).

An important aspect of the present invention is that these pauses (608 and 609) are exploited by the Audio Resource Manager (311) to transfer audio data into and out of Audio Data Buffer (215). This feature minimizes Video Display Memory (101) bandwidth or access conflicts between video data and audio data.

FIG. 5 also shows the architecture that permits the Host CPU (111) to interface and communicate with the Audio Codec (201) via the Audio Data Buffer (215). As mentioned previously, the Host CPU (111) initiates access to the Audio Data Buffer (215) through the Host Interface FIFO (302). The FIFO is a single four-level, 32-bit wide interface that provides both read and write access to the Audio Data Buffer (215). This function is controlled by the Select FIFO Mode bit in the Audio Control Register (304). The Host Access Enable initiates access to the Audio Resource Manager (311) and in particular, the Audio Data Buffer (215). When Host Access Enable is on, the Host CPU (111) may read or write the selected 32K area of system addresses to transfer audio data.

The segment of systems memory used for Host CPU (111) to access the Audio Resource Manager (208) is dependent on the operating state of the Video Graphics Controller (209). It can occupy a maximum space of 128 kilobytes from A0000 to BFFFF hex in the Host CPU (111) space. The starting address is adjusted by setting the memory map field in the miscellaneous register in the Video Graphics Controller (209). Thus, if the Video Graphics Controller (209) is in graphics mode, the memory is configured for 64 kilobytes starting at location A0000 box. The access address space will be 32 kilobytes in size starting at B8000. But if the Video Graphics Controller (209) is in text or Color Graphics Adapter (CGA) mode, the memory is 32 kilobytes starting at location B8000 hex, then the access address space will start at location A0000 hex. Thus, the Audio Access address space will always be located in a portion of system memory not used for graphics functions. Thus, the present invention effectively manages both audio and video I/O in the address-space that are standard for IBM PC-compatible systems. The address space typically allocated to black-and-white display graphics is used in those systems that operate with a color display. And the address space typically allocated to color display graphics is used in those systems that operate with a black-and-white display.

Since the Video Display Memory (101) is mapped into a contiguous block of memory in the host address space, the portion of memory (101) used for the Audio Data Buffer (215) will correspond to the memory address of the Host CPU address space. Thus, the Audio Data Buffer (215) will have a similar starting address and located as that found in the Host address space. But, if the video display memory is one or two megabytes, then the Audio Data Buffer (215) will be located in the upper area of the address space.

Once Host Access has been enabled and the FIFO mode has been selected, the Host CPU is able to have access to the Audio Data Buffer (215). In READ mode, when Host Access is enabled, the initial four audio data words are found in the lower portion of the Audio Data Buffer (215) which are loaded into the FIFO (302) to be read. Each time the FIFO (302) is loaded the Host Read Pointer (305) is incremented. After the Host has read all four data words, the FIFO (302) is loaded again as long as Host Access is enabled and data is available.

In WRITE mode, the data is found in the upper portion of the Audio Data Buffer (509). After the host has written the first four data words, the contents of the Host Interface FIFO (302) is then transferred to the Audio Data Buffer (215) and eventually transmitted to the Audio Codec (201). The Host Write Pointer (308) is incremented for each FIFO level written. In this case, Host Access Enable controls the final transfer of the FIFO (302) to the Audio Data Buffer (215).

As shown in FIG. 5, the Audio Data Buffer (215) has two buffer segments, one configured for audio input or record and the other for audio output or playback. The architecture of the buffer segments is circular in nature. Simply put, as the contents are retrieved from the one end of the buffer, new data is being stored at the other end of the buffer. Operating on a peer-to-peer basis, the Audio Codec (201) is writing or placing audio data from the Audio Record FIFO (508) at the write end of the audio record buffer, while the Host CPU (111) is reading audio data from Host Interface FIFO (302) that was retrieved from the bottom of the record buffer page. Each of the buffer pages has a corresponding set of pointers. By using this method of buffering, the address scheme is transparent to the Host CPU (111). As a result, the Host CPU (111) always reads or writes to and from the same set of addresses.

Initially, both the pointer at the read end of the buffer and the pointer at the write end of the buffer are initialized at the same location. As each read or write operation occurs, the corresponding pointer is advanced. In essence, these pointers are really counters incrementing each time a data word is either stored or retrieved. For the Audio Record Buffer (303), the Host Read Pointer (305) provides the address of the next data word to be read from the record buffer to be placed in the Host Interface FIFO (302). At the same time, the Audio Record Pointer (309) provides the address of the next data word to be written with the contents of the Audio Record FIFO (508).

For audio playback, the Host CPU (111) writes audio data from the Host Interface FIFO (302) at the top of the Audio Playback Buffer (301) of the buffer, the Audio Codec (201) reads audio data from the Audio Playback FIFO (504) that was retrieved from the bottom of the Audio Playback Buffer (301). The Host Write Pointer (308) or counter provides the address of the next data word that is to be written with the contents of the Host Interface FIFO (302). As before, the Codec Read pointer provides the address of the next data word to be read from the record buffer to be placed in the Host Interface FIFO (302).

To determine the available space in the buffer, a comparison is made between the two pointers each time the pointers are incremented. If the read-end pointer or the write-end pointer equal the value or address of the upper limit of the buffer, the pointer is then reset to the lower limit of the buffer, i.e. the buffer is used in a circular fashion. If the read-end and the write-end pointers are equal, then the buffer is full. When retrieving, the read-end and the write-end pointer are equal, then the buffer is empty. In this way the memory allocated to the buffer is effectively utilized.

Additionally, the present invention provides a threshold-sensitive method of recording audio data. This is useful for applications such as voice recognition because it allows setting a higher value for the threshold that triggers recording without missing the initial samples that led up to the first over-threshold sample. In other words, the start-recording threshold can be set high enough to filter noise without loosing the information on how the signal ramped up. That information can be useful for applications such as voice recognition, where for example, these initial samples may represent the initial sound of a spoken command word and may be important in recognizing that command word.

Figure 7:
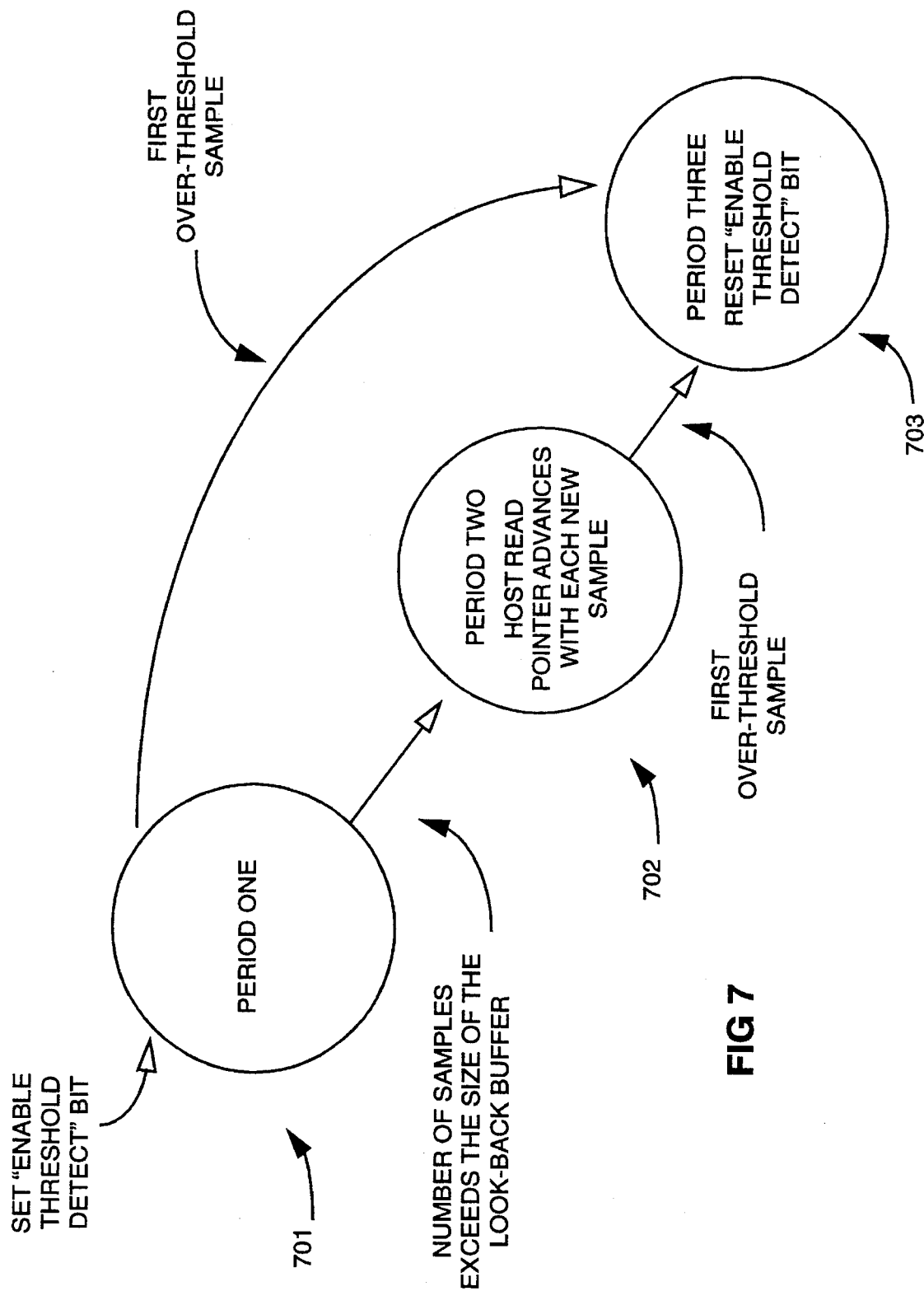
FIG. 7 shows the three stages or periods the present invention will operate in when in threshold-sensitive mode.

FIG. 7 shows the three stages or periods the present invention will operate in when in threshold-sensitive mode. The first period (701) starts as soon as threshold-sensitive audio recording is initiated. In this first period (701), as samples sent from the Audio Codec (201), the Audio Record Pointer (309) advances with each sample while the Host Read Pointer (305) remains stationary, pointing to the first sample that occurred after the recording operation was initiated. As described above, Host Read Pointer (305) provides the address of the next data word to be read from the Audio Record Buffer (301) and transferred to the Host CPU (111). The Audio Record Pointer (309) provides the address of the next data word or sample is to be written in the Audio Record Buffer (301).

After the Audio Record Buffer (301) contains a fixed number of samples (which is preferably half of the maximum number of samples that it can hold), the second period (702) is entered. In this period (702), samples are transferred from Audio Codec (201), the Audio Record Pointer (309) and the Host Read Pointer (305) each advance with each sample. This ensures that a look-back buffer is maintained and contains a predetermined number of samples before the threshold value was reached—preferably that there is a half-a-buffer's worth of information maintained prior to the current sample.

As soon as a sample is detected that exceeds the start-recording threshold, the third period (703) is entered. In this period (703), as samples are transferred from the Audio Codec (201), the Audio Record Pointer (309) advances with each sample and the Host Read Pointer (305) remains stationary, pointing to the sample that occurred half a buffer before the threshold value was exceeded. Note that the behavior of Host Read Pointer (305) during periods one and three is the same as during non-threshold-sensitive recording. But during period two (702), it advances at the same rate as the Audio Record Pointer (309) during period two (702), previously written samples (prior to the most recent half buffer's worth) maybe overwritten by incoming samples as circular buffer pointers advance.

Threshold-sensitive audio recording mode is entered when so,are executing on Host CPU (111) writes the threshold value to be used into the Threshold Register (520) and sets the Enable-Threshold-Detect control bit in the Audio Control Registers (304). (Design considerations in the preferred embodiment led to addressing that control bit is the high-order bit in the high-order byte of the Host Read Pointer (305).) When this control bit is set, Comparator (519) is enabled and compares the contents of the Threshold Register (520) with the high-order bits of each audio sample as it is received within Audio Resource Manager (208) from the Audio Codec (201). As long as the sample values remain lower than the threshold value, this control bit remains set and the Comparator (519) remains active. When a sample exceeds the threshold, then this control bit is reset—as indicated in FIG. 5 by the control line from Comparator (519) to the Audio Control Registers (304). The first over-threshold sample forces a transition from period two to period three—or from period one to period three if there were not at least half-a-buffer's worth of samples recorded prior to the first-over threshold sample. Once the Enable-Threshold-Detect control bit is reset, the Comparator (519) becomes inactive and the Host Read Pointer (305) advances in its usual manner, i.e. when audio data is transferred from the Audio Record Buffer (301) to the Host CPU (111).

While the preferred embodiment of the present invention has been disclosed and described herein, it will be obvious to those skilled in the art that various changes in form and detail may be made therein without departing from the spirit and scope of the invention. In particular, this embodiment describes steps in relationship to logic elements shown in FIG. 2 and FIG. 3 and the method depicted in FIG. 5. Those skilled in the art will note that many of the steps can be performed in parallel or simultaneously by virtue of the buffering technique. The Host CPU (101) and Audio Codec (201) can access and use all the resource provided by the Audio Resource Manager (208). Noise glitches, skipped samples and low performance are eliminated and full duplex operation becomes simple.

WavePort™ For Alpine CD5434 VGA GUI Accelerator

I. Introduction:

The WavePort™ for the Alpine CD5434 provides a new method of supporting digital audio that increases performance, adds new features, and lowers the total system cost.

Today's audio codecs either have a serial data interface or an eight-bit parallel data bus. Interfacing to an ISA bus requires the use of a DMA channel, bus control/address decode logic, and data buffers. The serial interface devices require a second ASIC to convert the serial date to parallel data and support the system bus control signals. A portion of system memory is then reserved as the audio data buffer and the DMA channel is programmed to transfer data between the Codec and the buffer. The DMA channel operates with requests provided by the Codec at the audio sample rate. At CD sample rates of 44.1 KHz, this is a DMA cycle every 22.6 usec. If any other system activity takes more then 22 usec before it can be stopped by a pending DMA request, the Codec will miss a data transfer. A missed transfer results in recording errors and playback noise pops. The ISA DMA controllers are 16-bits at best and not very fast. A DMA cycle must put the CPU in a hold state, perform the transfer and then release the CPU hold. Operation in 32-bit local bus systems would require many more pins on the Codec and a new 32-bit DMA controller. Another limitation is that since a single DMA channels is uni-directional, simultaneous record/play (full duplex) is not possible unless two DMA channels are used.

The Alpine VGA/GUI accelerator provides a glueless 32-bit VESA-VL end PCI local bus interface. This high-speed interface can be made available to the Audio Codec at the cost of only four pins for a serial data connection. A very cost-effective Codec can then provide full Business Audio under GUI systems like Windows, without a redundant system interface. For systems that require DOS hardware compatibility a device with a simple 8-bit DMA interface plus a serial port can provide performance under Windows and compatibility for DOS at a small increase in component cost. In addition, because all graphics modes have some unused memory available, the Alpine display memory can function as the Audio Data Buffer. For example, the 1024× 768 256 color mode has 256K of non-display memory. While some of this is used for the hardware cursor and graphics data caching functions, 64K bytes can be reserved as buffer space for the audio. This audio buffer can be read or written using block move instructions at the CPU speed. The audio data buffer takes up no extra system memory, and the buffer service can be triggered by interrupts without the strict timing requirements of DMA. Noise glitches, skipped samples and low performance are eliminated, and full duplex operation becomes simple!

The ability to support full duplex audio makes possible significant new functionality. Networking applications will require audio in both directions to hold a conversation. Full duplex audio will also allow new voice controlled multimedia applications. Since voice recognition uses nearly continual monitoring of the audio input, audio output with today's solutions requires stopping the input/recognition feature. Full duplex operation allows seamless voice-controlled interactive applications. In addition, the Alpine WavePort™ can be set to begin the audio input capture (and provide an interrupt) only when the audio level rises above a set threshold further improving the system performance.

Although current systems seem to be providing adequate performance levels, they are in general not attempting to stress the system. Most applications that use audio are only using 8-bit mono or stereo at low (11 or 22 Khz) sample rates. The new MPC II spec requires that 44.1 Khz 16-bit stereo output use no more than 15% of the system bandwidth. This 15% is still rather high considering the requirements of video playback. WavePort™ will be able to provide full duplex, 16-bit Stereo @44.1 Khz and use less than 4% of the system bandwidth.

II. WavePort™ Features

- Digital audio data buffer with 32-bit local bus interface to serial data Audio Codecs.
- Provides high-speed system interface to serial-bus audio codecs.
- Interrupt support for buffer half full/empty/full, time interval and input threshold.
- Provides up to two Auxiliary Select outputs at programmable I/O addresses.
- Audio data is stored in non-display memory:
  - Two selectable 32K (or 8K) data buffers for Audio Out end Audio In.
  - Audio data may be 8 or 16 bits/sample, mono or stereo.
  - Audio data is always packed into full DWORDs in the buffer.
  - 32K buffer provides 185 ms @44.1 Khz/16-bit stereo samples.
  - Buffer over/underrun detection and auto mute.
  - Input buffer may be triggered by activity (threshold detect).
- Memory-mapped access to buffers for fast burst transfers.
  - 32-bit memory interface in VESA-VL & PCI bus systems.
  - Audio data transfers at up to 10× the speed of ISA bus DMA.
  - Automatic addressing for the read and write circular data buffers.
  - Separate counts maintained for system and Codec transfers.
- Provides standard DSP four-wire serial data bus to codec.
  - Frame Sync, Serial Data Clock, Data In & Data Out.
  - Input and output sample rates are equal and controlled by the Codec.
  - WavePort™ operates as slave—Codec is the master (except in command mode)
  - Data format compatible with Crystal CS4215.
- Supports the following Crystal audio codecs:
  - CS4215: Provides basic Business Audio at the lowest system cost. Supports command mode—WavePort™ drives FSYNC and SCLK.
  - CS4231S: Modification of CS4231 with Serial Data Port. 8-bit ISA interface with DMA/IRQ for compatibility with MS SoundSystem.
- Alpine CS5434 Pins Used
  - EECS=SDO: serial data output to codec pin SDIN.
  - EEDI=SDI; serial data input from codec pin SDOUT.
  - OVRW=FSYNC; Frame Sync.
    - Sampled by SCLK, the rising edge indicates that the next complete SCLK is the start of a 64-bit data frame.
  - Pin 106 (Reserved)=SCLK: Serial Date Clock.
    - Data is transmitted on the rising edge and received on the falling edge.
  - TRW=Aux Select 1 (or D/C output for 4215).
  - MCLK=Aux Select 2 (or PDN for 4215 power down).
- Aux Select Output 1.
  - Programmable address decode for 4 or 8 I/O locations.
  - Programmable as Base+0 to Base+3 (or 7), Default is Base=530h.
  - Used as Chip Select for CS4231S or Command Mode control for CS4215.
- Aux Select Output 2.
  - Programmable address decode for 4 or 16 I/O locations. Default is 388h.
  - Chip Select for external music synthesizer chips or other devices.

III. Serial Data Interface:

The Codec serial data interface is composed of two very similar sections, one for input of audio and one for output. The basic blocks of each section are:
- 64-bit shift register.
- 32-bit wide audio sample FIFO.
- 32-bit register for continuous input/output of status or control data.
- Data packing/unpacking multiplexer.

The data FIFOs must be able to avoid under/overflow when the Hsync frequency is as low as 15.743 Khz (NTSC) and the audio is 16-bit stereo at 44.1 Khz.
15.743 Khz=63.52 usec
44.1 Khz=22.67 usec/sample; 3 samples=68.02 usec
Therefore, at least three FIFO levels are needed.

Basic I/O of WavePort™

Input

Figure 8:
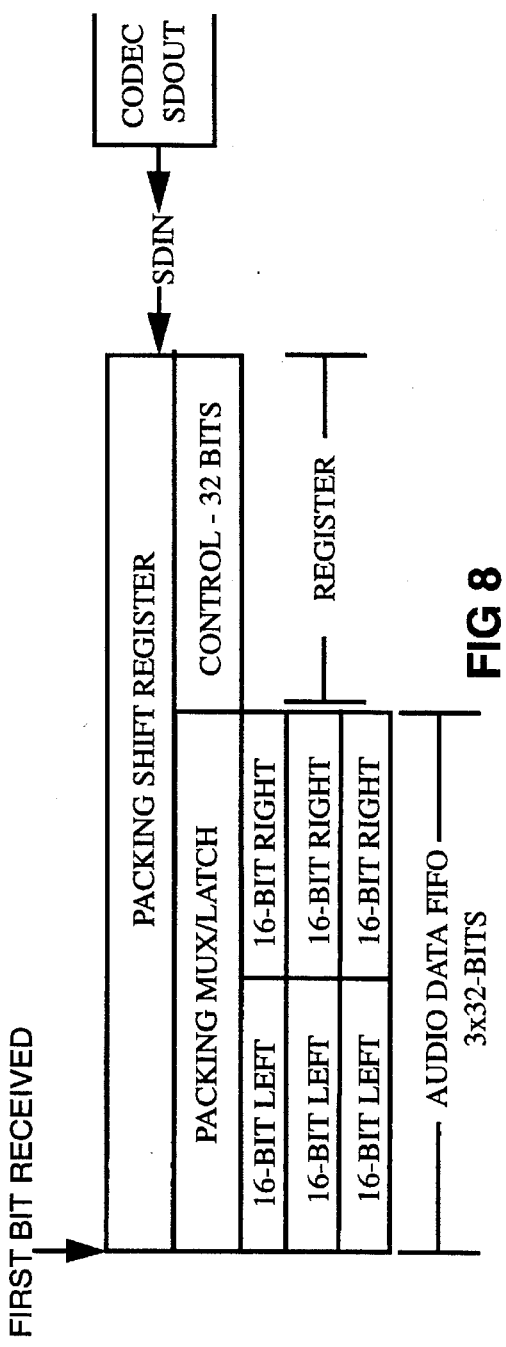
FIG. 8 shows the input section of the Codec serial data interface.

As is illustrated in FIG. 8, the Packing Multiplexer is also four bytes of latch and acts as a forth FIFO level. iI combines samples from multiple Codec data frames into complete DWORDs when mono and/or 8-bit or 4-bit ADPCM data is selected. The low byte (or word) the packed result contains the audio data received first.

Output

Figure 9:
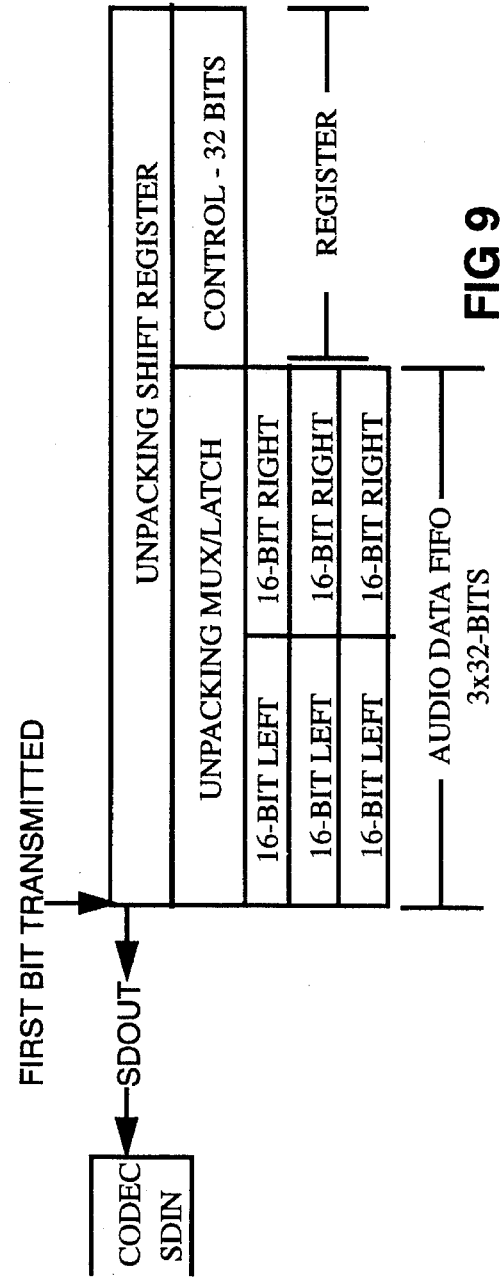
FIG. 9 shows the output section of the Codec serial data interface.

As is illustrated in FIG. 9, the Unpacking Multiplexer is also four bytes of latch and acts as a forth FIFO level. It sequentially unpacks the FIFO data from DWORDs to multiple Codec data frames when the audio format is mono and/or 8-bit or 4-bit ADPCM. After data unpacking, the unused locations in the 32-bit data portion of the shift register are filled with all zeros.

Figure 10:
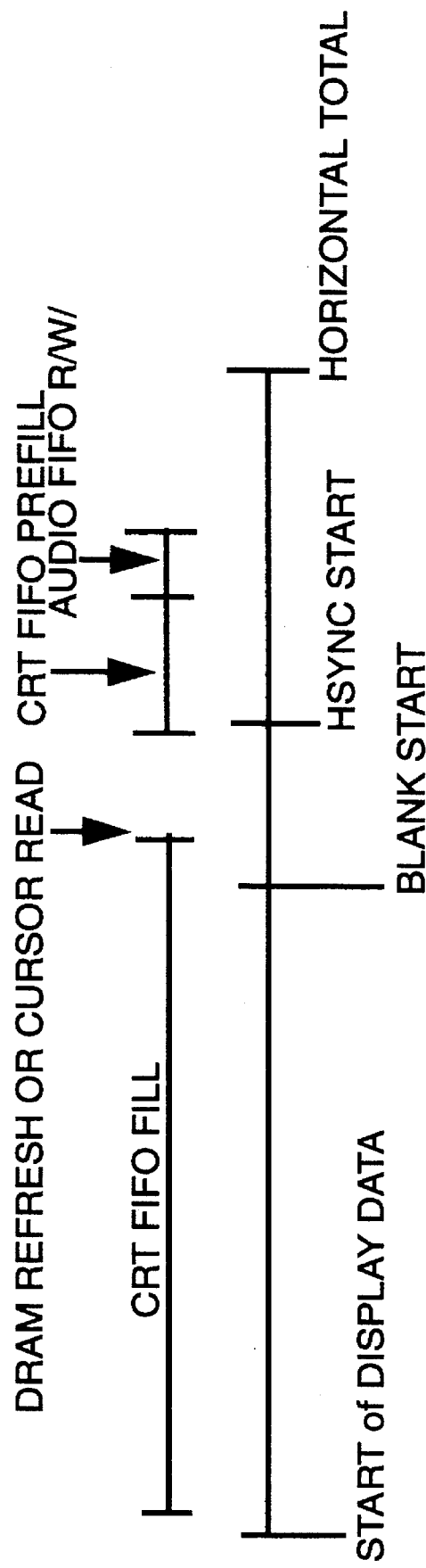
FIG. 10 shows sequencer events for each display scan line.

FIG. 10 illustrates sequencer Events for Each Display Scan Line:

The Audio input FIFOs' contents are not transferred to the memory buffer unless them are at least two full levels. Likewise, the output FIFO does not get serviced unless at least two levels are empty. This will make the best use of DRAM page cycles.

The system interface to the audio buffer is through a single four-level×32-bit FIFO. This FIFO is used for both reads and writes of audio data. The FIFO is configured by a register bit (under software control) to be either read or write. There is also a FIFO enable control bit. The functions of these two bits are as follows:

Read/Write Mode

Read; Host read of input audio data. The input audio data is in the lower portion of the 64K (or 8K) area in display memory selected. The Host Read pointer is incremented for each FIFO level load. The ENABLE bit controls the initial loading of the sample data FIFO.

Write: Host write of output audio data. The output audio data is in the upper portion of the 64K (or 8K)

area in display memory selected. The Host Write pointer is incremented for each FIFO level (DWORD) written. The ENABLE bit controls the final transfer of the sample data FIFO to the audio buffer.

Host Buffer Access Enable

The Read or Write mode should always be selected while the Host Buffer is in the off state. In the off state the Alpine memory interface acts in the normal Graphics controller manner. In the on state the Host may read or write the selected (see GR40-D6) 32K area of system addresses to transfer audio data samples. The system address is used by the Alpine as a block enable only, and address bits A14:0 do not get used in the data transfer. The Host Read or Host Write pointers control the addressing of display memory audio samples. The Host must always read or write DWORDs for proper operation. The on-off and off-on transitions of the Host Buffer Access Enable controls the action of the audio data FIFO depending on Read or Write mode selection.

Off-On transition:

Read Mode—The FIFO is loaded with the next four DWORDs of input samples and the Host Read pointer is incremented for each, DWORD. After the host has read all four DWORDs the FIFO is loaded again as long as the Host access is enabled.

Write Mode—After the host has written the first four DWORDs, the FIFO contents are transferred to the output buffer and the Host Write pointer incremented. The FIFO will continue to act as a write buffer as long as the Host access is enabled.

On-Off transition:

Read Mode—Any unread data in the FIFO is discarded and the Host Read pointer is decremented by the number of unread DWORD samples Write Mode—Any write date in the FIFO is transferred to the output buffer and the FIFO remains empty.

IV. System Interface Control With The CS4231S

For VESA-VL local bus designs, the CS4231S will get all control/config data through the 8-bit parallel data interface connected to the ISA bus. Compatibility with DOS games that write to hardware will be supported through the ISA bus with the standard DMA and IRQ signals.

In PCI designs, DOS (SoundSystem) compatibility Is not supported. Control/Config data will use the parallel interface connected to the 'BIOS ROM Address Support' pins (24–30). The Alpine will route the byte data from the PCI data bus D7:0 to the 4231S data pins. Support software will only write valid byte-wide data for the low byte on DWORD addresses. The other three bytes of a DWORD read/write will not be used. The Alpine WavePort will supply the required chip select, IOR (pin 31), IOW (pin 32), and address signals (pins 34–36) to the CS4231S, The IRQ and DMA pins of the 4231S will not be used. Although DOS compatibility is not supported on PCI bus, the 4231S would be used where its' advanced features (such as ADPCM) are required.

V. Detail Description of the WavePort™ Registers:

These are extensions of the Graphics Controller Register index/data pairs, and are summarized in FIG. 11. I/O access only.

WavePort™ Register Details:

| | | |
|---|---|---|
| GR40: | | WavePort Control 1 |
| D7 | | Audio buffer size. |
| | | 1 = 0 Two buffers (transmit & receive) of 32K bytes each. |
| | | 0 = Two buffers (transmit & receive) of 8K bytes each. |
| D6 | | Enable Host Access and audio data FIFO |
| | | The system memory range used for the Host Access depends on the Alpine display memory configuration. If the Alpine is in a graphics mode and the memory is located at segment A000 (for 64K) the Host Access will be B800 for 32K. The BitBLT registers must be set to I/O mapping before any host access is attempted. If the Alpine is in a text or CGA mode at B800 for 32K, the Host Access will be at A000 for 32K. This selection is automatic and controlled by the standard VGA address select bits in GR6, bits D3:2. If GR6-D3:2 = 01 then the Host access is at B800, and if GR6.03:2 is set to 11, the HOST access is A000. If the Alpine is set for linear addressed display memory. the Host access address is still controlled by GR6-D3:2. |
| | | 0 = Host Access off |
| | | 1 = Host Access on |
| D5 | | Select Read/Write Mode for Host Access of audio data, |
| | | 0 = Read Mode, host reads the sampled audio data for storage or analysis. |
| | | 1 = Write Mode, host writes audio data to be played back. |
| D4:3 | | Codec select. |
| | | 00 = CS4215 (configures Aux 1 pin as D/C output) |
| | | 01 = CS4231S (configures Aux 1 pin as chip select output) |
| | | 10 = Reserved |
| | | 11 = Reserved |
| D2 | | Stereo/Mono select for data packing. |
| | | 0 = Mono samples |
| | | 1 = Stereo samples |
| D1:0 | | Audio sample data format select for data packing into full DWORDs. |
| | | On output underrun, selecting 8 or 16 bit format also causes the WavePort to continue to resend the last valid sample. If ADPCM is selected, underrun causes data of all '0's to be transmitted. |
| | | 00 = 16-bit sample data |
| | | 01 = 8-bit sample data (high byte of left/right sample words) |
| | | 10 = 4-bit ADPCM data |
| | | 11 = Reserved |
| GR41: | | WavePort Control 2 |
| D7 | | Reserved |
| | | A '0' will force output state of the Aux 2 pin low for Power Down of the 4215. |

|         |                                                                                   |
|---------|-----------------------------------------------------------------------------------|
|         | The RESET state is '1'.                                                           |
| D5      | Enable Command Mode output for the FSYNC, SCLK and SDOUT pins. The Host can send configuration/setup data to the 4215 by simple manipulation of the output levels. The 4215 must have first been placed in Commend Mode by outputing a low level on the Aux 1 (D/C) pin. |
| D4      | Reflects the input level on the SDIN pin in Command Mode.                         |
| D3      | Output state of the SDOUT pin when Command Mode is selected.                      |
| D2      | Output state of the SCLK pin when Command Mode is selected.                       |
| D1      | Output state of the FSYNC pin when Command Mode is selected.                      |
| D0      | Output state of the D/C pin in 4215 mode. (RESET state is '1').                   |
| GR42:   | input Audio Threshold level setting.                                              |
| D7:0    | This selects the audio input level that will trigger the input threshold Interrupt. The threshold trigger will also release the Host Read pointer from lock with the Codec Input pointer and re-enable the detection of input data overrun. This data is compared to D14-7 of the Left Channel data In 16-bit linear PCM mode, and anything greater than the Programmed data activates the trigger. Only the positive data excursions are checked. Because 16-bit data is signed data, if D15 of the input data is a '1' (negative), the compare is not performed. This register is valid only when Threshold Compare is selected in GR45, bit D7 and the data mode is 16-bit linear PCM. Refer to GR45-D7 information for an explanation of how the Host Read pointer is affected by this feature. |
| GR43:   | Audio Data Buffer base address location                                           |
| D7      | Reserved.                                                                         |
| D6:0    | The value defines the display memory region (display address bits A22:16) that selects the 65K (or 8K) portion of memory where the audio data buffer is located in the 512K of display memory. When the display memory is 1 or 2 Meg, the audio buffer is always located in the upper area of the address space (A24 & A23 = 1). |
| GR44:45 | Input Audio buffer Host Read pointer                                              |
|         | The 13-bit counter (8K of DWORD audio data samples) that provides the address offset (from the GR43 selected base) of the next DWORD to read from the output buffer and place in the Host data read FIFO. This counter is incremented on each transfer to the FIFO. The audio data buffer is a circular buffer - the counter wraps around through zero. This register may be written by the CPU to clear or present the buffer pointer. It may be read by the CPU to determine what audio sample is the last sample read. It may also be checked against the Codec Input counter to determine how much buffer space is remaining. |
| GR44:   | Input Audio buffer Host Read pointer low byte.                                    |
| D7:0    | Pointer bits 7:0.                                                                 |
| GR45:   | Input Audio buffer Host Read pointer high byte.                                   |
| D7      | Enable Threshold Detect mode for Host Read pointer when set to '1' When Threshold Detect mode is enabled, until the programmed threshold (as set by GR42) is exceeded, the input overrun detection is disabled. In addition, as soon as the input buffer becomes half full, the Host Read pointer will be automatically incremented each time the Codec Input Write pointer is incremented. This feature maintains a sample pre-buffer of data before the threshold value was reached. This will be usefull for voice recognition applications by allowing a higher setting on the threshold without missing the initial samples from a command. Once the threshold has been reached this bit will be automatically cleared and the Host Read pointer will function in the usual manner (increment only on valid Host Reads). |
| D6:5    | Reserved                                                                          |
| D4:0    | Pointer bits 12:8.                                                                |
| GR46:47 | Input Audio buffer Codec Input Write pointer                                      |
|         | The 13-bit counter (8K of DWORD audio data samples) that provides the address offset (from the GR43 selected base) of the next DWORD to read from the output buffer and place in the data output FIFO. This counter is incremented on each transfer to the transmit FIFO. The audio data buffer is a circular buffer - the counter wraps around through zero. This register may be written by the CPU to clear or preset the buffer pointer. It may be read by the CPU to determine what audio sample is currently about to be sent to the Codec. It may also be checked against the Codec Ou counter to determine how much buffer open is available. |
| GR46:   | Input Audio buffer Codec Write pointer low byte.                                  |
| D7:0    | Pointer bits 7:0.                                                                 |
| GR57:   | Input Audio buffer Codec pointer high byte.                                       |
| D7      | Enable Input. A '1' start the input of data from the Codec.                       |
| D6:5    | Reserved                                                                          |
| D4:0    | Pointer bits 12:8.                                                                |
| GR48:49 | Output Audio buffer Host Write pointer                                            |
| GR48:   | Input Audio buffer Host Read pointer low byte.                                    |
| D7:0    | Pointer bits 7:0.                                                                 |
| GR49:   | Output Audio buffer Host Read pointer high byte.                                  |
| D7:0    | Reserved                                                                          |
| D4:0    | Pointer bits 12:8.                                                                |
| GR4A:4B | Output Audio buffer Codec Output Read pointer                                     |
| GR4A:   | OutputAudio buffer Codec Write pointer low byte.                                  |
| D7:0    | Pointer bits 7:0.                                                                 |
| GR4B:   | Output Audio buffer Codec pointer high byte.                                      |
| D7      | Enable Output. A '1' will start the output of data to the Codec.                  |
| D6:5    | Reserved                                                                          |

| | |
|---|---|
| D4:0 | Pointer bits 12:8. |
| BR4C: | Interrupt Control |
| D7 | Reserved |
| D6 | Enable overrun and underrun error interrupt generation. |
| D5 | Standard VGA Interrupt Disable (Reset state = 0).<br>0 = Allow CR11, D5 to enable/disable VSYNC interrupts.<br>1 = Disable (override) the standard VSYNC interrupt control in CR11, D5. |
| D4 | Vsync Interval Interrupt<br>0 = Disable this interrupt source.<br>1 = Enable at the divide-down Vsync rate as set by D3:2.<br>The Interrupt is activated at the end of Vertical Display Enable for each field in both interlace and non-interlaced display modes. |
| D3:2 | Vsync Interrupt Rate Select.<br>00 = Vsync rate,<br>01 = Vsync/2,<br>10 = Vsync/4,<br>11 = Vsync/8. |
| D1 | Audio Data Transmit Buffer Half-Empty Interrupt.<br>0 = Disable this interrupt source.<br>1 = Enable interrupt when the audio input buffer is more than ½ empty.<br>This interrupt is available only when the audio buffer size is 32K bytes. The upper four bits (12:9) of the Host Write Pointer are subtracted from the corresponding Codec Output pointer bits to indicate that 16K bytes +/− 2K of data remains in the buffer (4K +/− 512 DWORDs). The audio buffer must have been previously loaded to more than ½ full before the interrupt can become active each tune it is enabled. |
| D0 | Audio Data Receive Buffer Half-Full Interrupt.<br>0 = Disable this interrupt source.<br>1 = Enable interrupt when the audio input buffer is more than ½ empty.<br>This interrupt is available only when the audio buffer size is 32K bytes. The upper four bits (12:9) of the Host Read pointer are subtracted from the corresponding Codec input pointer bits to indicate that 16K bytes +/− 2K of new data is in the buffer (4K +/− 512 DWORDs). The audio buffer must have been previously emptied to less than ½ full before this interrupt can become active each time it is enabled. |
| GR4D: | Interrupt Status<br>These status bits indicate any active (enable) interrupts. Reading this register will clear the interrupt state and reset the status bits. The Standard VGA interrupt is not cleared or reset by a read of this register, the status bit is merely a copy of the standard VGA interrupt pending bit in 3C2, D7 and is provided for software convenience. |
| D7:6 | Reserved (= 0). |
| D5 | Standard VGA Vsync Interrupt (state of 3C2, D7).<br>1 = Interrupt pending.<br>0 = No interrupt pending. |
| D4 | Csync Interval Interrupt<br>1 = Interrupt pending.<br>0 = No interrupt pending. |
| D3 | Audio input (Record) Buffer Full Interrupt (Over-run).<br>1 = Interrupt pending.<br>0 = No interrupt pending. |
| D2 | Audio Input (Record) Buffer Half-Full Interrupt<br>1 = Interrupt pending.<br>0 = No interrupt pending. |
| D1 | Audio Output (Play) Empty Interrupt (Under-run).<br>1 = Interrupt pending.<br>0 = No interrupt pending. |
| D0 | Audio Output (Play) Butter Half-Empty Interrupt<br>1 = Interrupt pending.<br>0 = No interrupt pending. |
| GR4E: | Reserved. |
| D7:0 | Reserved |
| GR4E: | Reserved |
| D7:0 | Reserved |
| GR50:53 | Codec Status DWORD; read-only data.<br>This data reflects the most recently received 32 bits of status from the Codec. The four byte-wide registers are updated each FSYNC. Each individual register is prevented from changing in the middle of a host read (it FSYNC occurs during a host read, the data will updated after the end of the I/O read). This data does not change very often and is therefore not buffered in display memory. This data may be read at any time by the host CPU. |
| GR50: | Codec Status Data 7:0. |
| D7:0 | This is the last byte of data received from each Codec Data Frame. |
| GR51: | Codec Status Data 15:8. |
| D7:0 | This is the next-to-last byte (seventh) of data received from each Codec Data Frame. |
| GR52: | Codec Status Data 23:16. |
| D7:0 | This is the sixth byte of data received from each Codec Data Frame. |
| GR53: | Codec Status Data 31:24. |
| D7:0 | This is the fifth byte of data received from each Codec Data Frame. |
| GRS3:57 | Codec Control DWORD |

-continued

|        |                                                                                                                                                                                                                                                                                                                                                      |
|--------|------------------------------------------------------------------------------------------------------------------------------------------------------------------------------------------------------------------------------------------------------------------------------------------------------------------------------------------------------|
|        | The control data is sent to the Codec each Data Frame and is used to control the real-time operation of the Codec. This data is not changed very often by the controlling software and is therefore not buffered in display memory. The real-time functions are input gain control, output attenuation, input selection and output enables. The start of a write to this register will hold off the transfer to the shift register (if FSYNC occurs during the write) until the next FSYNC after the end of the write cycle. |
| GR54:  | Codec Control Data 7:0.                                                                                                                                                                                                                                                                                                                              |
| D7:0   | This is the last byte of data transmitted during each Codec Data Frame.                                                                                                                                                                                                                                                                              |
| GR55:  | Codec Control Data 15:8.                                                                                                                                                                                                                                                                                                                             |
| D7:0   | This is the seventh byte of data transmitted during each Codec Data Frame.                                                                                                                                                                                                                                                                           |
| GR56:  | Codec Control Data 23:16.                                                                                                                                                                                                                                                                                                                            |
| D7:0   | This is the sixth byte of data transmitted during each Codec Data Frame.                                                                                                                                                                                                                                                                             |
| GR57:  | Codec Control Data 31:24.                                                                                                                                                                                                                                                                                                                            |
| D7:0   | This is the fifth byte of data transmitted during each Codec Data Frame.                                                                                                                                                                                                                                                                             |
| GR58:  | Aux Select 1, base I/O address low byte.                                                                                                                                                                                                                                                                                                             |
| D7:0   | This selects the base address compare for system address bits A9:2.                                                                                                                                                                                                                                                                                  |
| GR59:  | Aux Select 1, base I/O address high byte and control,                                                                                                                                                                                                                                                                                                |
| D7     | Enable Aux Sel 1 low-true output on I/O address compare match.                                                                                                                                                                                                                                                                                       |
| D6     | Select four or eight byte block of I/O address.<br>0 = Four bytes of I/O address space for Aux 1 decode.<br>1 = Eight bytes of I/O address space for Aux 1 decode (A2 is it don't care).                                                                                                                                                             |
| D5:4   | Reserved                                                                                                                                                                                                                                                                                                                                             |
| D3:0   | This selects the base address match for system address bits A13:10<br>System Address bits A15 & A14 must be '0' for a compare match.                                                                                                                                                                                                                 |
| GR5A:  | Aux Select 2, base I/O address low byte.                                                                                                                                                                                                                                                                                                             |
| D7:0   | this selects the base address compare for system address bits A9:2.                                                                                                                                                                                                                                                                                  |
| GR5B:  | Aux Select 2, base I/O address high byte and control.                                                                                                                                                                                                                                                                                                |
| D7     | Enable Aux Sel 2 low-true output on I/O address compare match.                                                                                                                                                                                                                                                                                       |
| D6     | Select four or sixteen byte block of I/O addresses.<br>0 = Four bytes of I/O address space for Aux 2 decode.<br>1 = Sixteen bytes of I/O address space for Aux 2 decode (A3:2 are don't care).                                                                                                                                                       |
| D5:4   | Reserved.                                                                                                                                                                                                                                                                                                                                            |
| D3:0   | This selects the base address match for system address bits A13:10<br>System Address bits A15 & A14 must be '0' for a compare match.                                                                                                                                                                                                                 |

Note:
The Aux 1 and 2 select registers are cleared by RESET.

I claim:

1. A computer-based multimedia system, comprising:

a host CPU;

a display device;

an audio transducer;

an audio codec to transfer audio signals to or from said audio transducer;

a digital, random access video display memory having a plurality of buffer segments, at least one said buffer segment for video data and at least one said buffer segment for audio data;

a video graphics controller, responsive to said host CPU, to control the display of said video data on said display device;

an audio resources manager, responsive to said host CPU, to control said audio codec and to control the transfer of said audio data between said host CPU and said video display memory and between said video display memory and said audio codec;

a video memory controller, responsive to said video graphics controller and to said audio resources manager, to store and retrieve said video data and said audio data within said video display memory; and a host CPU interface to couple said host CPU to both said video graphics controller and to said audio resources manager.

2. An high-performance computer-based multimedia system, comprising:

a host CPU;

a display device;

an audio transducer;

an audio codec to transfer audio signals to or from said audio transducer;

a digital, random access video display memory having a plurality of buffer segments, at least one said buffer segment for video data and at least one said buffer segment for audio data;

a video graphics controller, responsive to said host CPU, to control the displaying of lines of said video data on said display device, said displaying having temporal pauses between said adjacent lines;

an audio resources manager, responsive to said host CPU, to control said audio codec and to control the transfer of said audio data between said host CPU and said video display memory and between said video display memory and said audio codec, said transfer between said video display memory and said audio codec occurring substantially only during said pauses;

a video memory controller, responsive to said video graphics controller and to said audio resources manager, to store and retrieve said video data and said audio data within said video display memory; and a host CPU interface to couple said host CPU to both said video graphics controller and to said audio resources manager.

3. A threshold-sensitive computer-based multimedia system, comprising:

a host CPU;

a display device;

an audio transducer;

an audio codec to transfer audio signals to or from said audio transducer;

a digital, random access video display memory having a plurality of buffer segments, at least one said buffer segment for video data and at least one said buffer segment for audio data;

a video graphics controller, responsive to said host CPU, to control the displaying of said video data on said display device;

an audio resources manager, responsive to said host CPU, to control said audio codec and to transfer said audio data between said host CPU and said video display memory and between said video display memory and said audio codec, said audio resources manager including a host read pointer to address said video display memory during the transfer of said audio data to said host CPU, the transfer from said audio codec to said video display memory advancing the value of said host read pointer during a period prior to when a value of any sample of said audio data exceeds a predetermined threshold value and subsequent to when a predetermined number of samples have been transferred into said video display memory whereby said host read pointer addresses a sample that preceded the first over-threshold sample by up to said predetermined number of samples;

a video memory controller, responsive to said video graphics controller and to said audio resources manager, to store and retrieve said video data and said audio data in and from said video display memory; and a host CPU interface to couple said host CPU to both said video graphics controller and to said audio resources manager.

4. An high-performance, threshold-sensitive computer-based multimedia system, comprising:

a host CPU;

a display device;

an audio transducer;

an audio codec to transfer audio signals to or from said audio transducer;

a digital, random access video display memory having a plurality of buffer segments, at least one said buffer segment for video data and at least one said buffer segment for audio data;

a video graphics controller, responsive to said host CPU, to control the displaying of lines of said video data on said display device, said displaying having temporal pauses between said adjacent lines;

an audio resources manager, responsive to said host CPU, to control said audio codec and to transfer said audio data between said host CPU and said video display memory and between said video display memory and said audio codec, said transfer between said video display memory and said audio codec occurring substantially during said pauses, said audio resources manager including a host read pointer to address said video display memory during the transfer of said audio data to said host CPU, the transfer from said audio codec to said video display memory advancing the value of said host read pointer during a period prior to when the value of any sample of said audio data exceeds a predetermined threshold value and subsequent to when a predetermined number of samples have boon transferred into said video display memory whereby said host read pointer addresses a sample that preceded the first over-threshold sample by up to said predetermined number of samples;

a video memory controller, responsive to said video graphics controller and to said audio resources manager, to store and retrieve said video data and said audio data in and from said video display memory; and a host CPU interface to couple said host CPU to both said video graphics controller and to said audio resources manager.

5. The computer-based multimedia system of any one of claims 1 through 4, wherein:

said audio data is stored and retrieved using a circular sequence of addresses within said audio data buffer segment.

6. The computer-based multimedia system of any one of claims 1 through 4, wherein:

said transfer of audio data to or from said audio codec occurs over a serial interface bus.

7. The computer-based multimedia system of any one of claims 2 or 4, wherein:

said audio resources manager includes at least one first-in-first-out buffer through which said audio data is transferred to or from said audio codec, said buffers being of a predetermined depth such that they accommodate as many audio samples as are consumed or produced by said audio codec between adjacent pairs of said pauses.

8. A storage subsystem for audio and video data within a computer-based multimedia system, comprising:

a system bus;

an audio codec;

a digital, random access video display memory having a plurality of buffer segments, at least one said buffer segment for video data and at least one said buffer segment for audio data;

a video graphics controller, responsive to commands presented on said system bus, to control the displaying of said video data;

an audio resources manager, responsive to commands presented on said system bus, to control said audio codec and to control the transfer of said audio data between said system bus and said video display memory and between said video display memory and said audio codec;

a video memory controller, responsive to said video graphics controller and to said audio resources manager, to store and retrieve said video data and said audio data in and from said video display memory; and a bus interface to couple said system bus to both said video graphics controller and to said audio resources manager.

9. An high-performance storage subsystem for audio and video data within a computer-based multimedia system, comprising:

a system bus;

an audio codec;

a digital, random access video display memory having a plurality of buffer segments, at least one said buffer segment for video data and at least one said buffer segment for audio data;

a video graphics controller, responsive to commands presented on said system bus, to control the displaying of lines of said video data, said displaying having temporal pauses between said adjacent lines;

an audio resources manager, responsive to commands presented on said system bus, to control said audio codec and to control the transfer of said audio data between said system bus and said video display memory and between said video display memory and said audio codec, said transfer between said video display memory and said audio codec occurring substantially during said pauses;

a video memory controller, responsive to said video graphics controller and to said audio resources manager, to store and retrieve said video data and said audio data in and from said video display memory; and a bus interface to couple said system bus to both said video graphics controller and to said audio resources manager.

10. A threshold-sensitive storage subsystem for audio and video data within a computer-based multimedia system, comprising:

a system bus;

an audio codec;

a digital, random access video display memory having a plurality of buffer segments, at least one said buffer segment for video data and at least one said buffer segment for audio data;

a video graphics controller, responsive to commands presented on said system bus, to control the displaying of said video data;

an audio resources manager, responsive to commands presented on said system bus, to control said audio codec and to control the transfer of said audio data between said system bus and said video display memory and between said video display memory and said audio codec, said audio resources manager including a system read pointer to address said video display memory during the transfer of said audio data to said system bus, the transfer from said audio codec to said video display memory advancing the value of said system read pointer during a period prior to when the value of any sample of said audio data exceeds a predetermined threshold value and subsequent to when a predetermined number of samples have been transferred into said video display memory whereby said system read pointer addresses a sample that preceded the first over-threshold sample by up to said predetermined number of samples;

a video memory controller, responsive to said video graphics controller and to said audio resources manager, to store and retrieve said video data and said audio data in and from said video display memory; and a bus interface to couple said system bus to both said video graphics controller and to said audio resources manager.

11. An high-performance, threshold-sensitive storage subsystem for audio and video data within a computer-based multimedia system, comprising:

a system bus;

an audio codec;

a digital, random access video display memory having a plurality of buffer segments, at least one said buffer segment for video data and at least one said buffer segment for audio data;

a video graphics controller, responsive to commands presented on said system bus, to control the displaying of lines of said video data, said displaying having temporal pauses between said adjacent lines;

an audio resources manager, responsive to commands presented on said system bus, to control said audio codec and to control the transfer of said audio data between said system bus and said video display memory and between said video display memory and said audio codec, said transfer between said video display memory and said audio codec occurring substantially during said pauses, said audio resources manager including a system read pointer to address said video display memory during the transfer of said audio data to said system bus, the transfer from said audio codec to said video display memory advancing the value of said system read pointer during a period prior to when the value of any sample of said audio data exceeds a predetermined threshold value and subsequent to when a predetermined number of samples have been transferred into said video display memory whereby said system read pointer addresses a sample that preceded the first over-threshold sample by up to said predetermined number of samples;

a video memory controller, responsive to said video graphics controller and to said audio resources manager, to store and retrieve said video data and said audio data in and from said video display memory; and a bus interface to couple said system bus to both said video graphics controller and to said audio resources manager.

12. The subsystem of any one of claims 8 through 11, wherein:

said audio data is stored and retrieved using a circular sequence of addresses within said audio data buffer segment.

13. The computer-based multimedia system of any one of claims 8 through 11, wherein:

said transfer of audio data to or from said audio codec occurs over a serial interface bus.

14. The computer-based multimedia system of any one of claims 9 or 11, wherein:

said audio resources manager includes at least one first-in-first-out buffer through which said audio data is transferred to or from said audio codec, said buffers being of a predetermined depth such that they accommodate as many audio samples as are consumed or produced by said audio codec between adjacent pairs of said pauses.

15. A multimedia controller, comprising:

a system bus interface;

a memory controller to control the storage and retrieval of both video data and audio data within a single digital, random access video display memory;

a video graphics controller, responsive to commands received on said system bus interface, to control the transfer of said video data from said system bus interface to said memory controller, and to control display of said video data; and an audio resources manager, responsive to commands received on said system bus interface, to control the transfer of said audio data between said system bus interface and said memory controller, and to control recording or playback of said audio data.

16. An high-performance multimedia controller, comprising:

a system bus interface;

a memory controller to control the storage and retrieval of both video data and audio data within a single digital, random access video display memory;

a video graphics controller, responsive to commands received on said system bus interface, to control the transfer of said video data from said system bus interface to said video display memory, and to control the display of lines of said video data, said display having temporal pauses between said adjacent lines; and an audio resources manager, responsive to commands received on said system bus interface, to control the transfer of said audio data between said system bus interface and said memory controller, and to control recording or playback of said audio data, the storage or retrieval of said audio data for said recording or playback occurring substantially during said pauses.

17. A threshold-sensitive multimedia controller, comprising:

a system bus interface;

a memory controller to control the storage and retrieval of both video data and audio data within a single digital, random access video display memory;

a video graphics controller, responsive to commands received on said system bus interface, to control the transfer of said video data from said system bus interface to said video display memory, and to control displaying of said video data; and an audio resources manager, responsive to commands received on said system bus interface, to control the transfer of said audio data from said memory controller to said system bus interface, and to control recording said audio data from sound, said audio resources manager including a system read pointer to address said audio data during its transfer from said memory controller to said system bus interface, the value of said system read pointer advancing during a period prior to when the value of any sample of said audio data exceeds a predetermined threshold value and subsequent to when a predetermined number of samples have been taken whereby said system read pointer addresses a sample that preceded the first over-threshold sample by up to said predetermined number of samples.

18. An high-performance, threshold-sensitive multimedia controller, comprising:

a system bus interface;

a memory controller to control the storage and retrieval of both video data and audio data within a single digital, random access video display memory;

a video graphics controller, responsive to commands received on said system bus interface, to control the transfer of said video data from said system bus interface to said video display memory, and to control the display of lines of said video data, said display having temporal pauses between said adjacent lines; and an audio resources manager, responsive to commands received on said system bus interface, to control the transfer of said audio data from said memory controller to said system bus interface, and to control recording said audio data from sound, the storage of said audio data during said recording occurring substantially during said pauses, said audio resources manager including a system read pointer to address said audio data during its transfer from said memory controller to said system bus interface, the value of said system read pointer advancing during a period prior to when the value of any sample of said audio data exceeds a predetermined threshold value and subsequent to when a predetermined number of samples have been taken whereby said system read pointer addresses a sample that preceded the first over-threshold sample by up to said predetermined number of samples.

19. The multimedia controller of any one of claims 15 through 18, wherein:

said audio resources manager addresses said audio data using a circular sequence of addresses.

20. The multimedia controller of any one of claims 15 through 18, further including:

a serial interface through which said audio data is transferred to or from said audio resources controller for recording or playback.

21. The multimedia controller of any one of claims 16 or 18, wherein:

said audio resources manager includes one or more first-in-first-out buffers to transfer said audio data for recording or playback, said buffers being of a predetermined depth such that they accommodate as many audio samples as are consumed or produced between adjacent pairs of said pauses.

22. A method of audio playback within a computer-based multimedia system, comprising:

allocating a segment of a digital, random access video display memory to hold video data;

allocating a segment of said video display memory to hold audio data;

transferring said video data from a host CPU to a system bus, then to a system bus interface, then to said video display memory, and subsequently, retrieving said video data from said video display memory and displaying said video data on a display device; and transferring said audio data from said host CPU to said system bus, then to said system bus interface, then to said video display memory, and subsequently, retrieving said audio data from said video display memory and reproducing it by means of an audio codec and a transducer.

23. A method of audio recording within a computer-based multimedia system, comprising:

allocating a segment of a digital, random access video display memory to hold video data;

allocating a segment of said video display memory to hold audio data;

transferring said video data from a host CPU to a system bus, then to a system bus interface, then to said video display memory, and subsequently, retrieving said video data from said video display memory and displaying it on a display device; and generating audio data from sound by means of a transducer and an audio codec, then storing said audio data in said video display memory, and subsequently, retrieving said audio data from said video display memory, transferring it to said system bus interface, then to said system bus, and then to said host CPU.

24. An high-performance method of storing audio playback data and video data within a computer-based multimedia system, comprising:

allocating a segment of a digital, random access video display memory to hold video data;

allocating a segment of said video display memory to hold audio data;

storing said video data from a system bus to said video display memory, and subsequently, retrieving from said video display memory lines of said video data to be displayed, said video data retrieving having temporal pauses between said adjacent lines; and storing said audio data from said system bus into said video display memory, and subsequently, retrieving said audio data from said video display memory and reproducing it on by means of an audio codec and a transducer, said audio data retrieving occurring substantially during said pauses.

25. An high-performance method of storing audio recording data and video data within a computer-based multimedia system, comprising:

allocating a segment of a digital, random access video display memory to hold video data;

allocating a segment of said video display memory to hold audio data;

storing said video data from a system bus to said video display memory, and subsequently, retrieving from said video display memory lines of said video data to be displayed, said video data retrieving having temporal pauses between said adjacent lines; and generating audio data from sound by means of a transducer and an audio codec, then storing said audio data in said video display memory, and subsequently, retrieving said audio data from said video display memory to said system bus, said audio data storing occurring substantially during said pauses.

26. A threshold-sensitive method of storing audio recording data and video data within a computer-based multimedia system, comprising:

allocating a segment of a digital, random access video display memory to hold video data;

allocating a segment of said video display memory to hold audio data;

transferring said video data from a host CPU to a system bus, then to a system bus interface, then to said video display memory, and subsequently, retrieving said video data from said video display memory and displaying it on a display device; and generating audio data from sound by means of a transducer and an audio codec, then storing said audio data in said video display memory, and subsequently, retrieving said audio data from said video display memory to said system bus, said audio data retrieving being addressed by a system read pointer within said audio resources manager, the value of said system read pointer being advanced during a period prior to when the value of any sample of said audio data exceeds a predetermined threshold value and subsequent to when a predetermined number of samples have been taken; and making available via said system read pointer up to said predetermined number of samples that occurred immediately prior to the first sample that exceeded said predetermined threshold.

27. An high-performance, threshold-sensitive method of storing audio recording data and video data within a computer-based multimedia system, comprising:

allocating a segment of a digital, random access video display memory to hold video data;

allocating a segment of said video display memory to hold audio data;

storing said video data from a system bus to said video display memory, and subsequently, retrieving from said video display memory lines of said video data to be displayed, said video data retrieving having temporal pauses between said adjacent lines;

generating audio data from sound by means of a transducer and an audio codec, then storing said audio data in said video display memory, and subsequently, retrieving said audio data from said video display memory to said system bus, said audio data storing occurring substantially during said pauses, said audio data retrieving being addressed by a system read pointer within said audio resources manager, the value of said system read pointer being advanced during a period prior to when the value of any sample of said audio data exceeds a predetermined threshold value and subsequent to when a predetermined number of samples have been taken; and making available via said system read pointer up to said predetermined number of samples that occurred immediately prior to the first sample that exceeded said predetermined threshold.

* * * * *